(12) United States Patent
Wattrus et al.

(10) Patent No.: US 12,269,552 B2
(45) Date of Patent: Apr. 8, 2025

(54) MOUNTING INTERFACES, DEVICES THEREWITH, ACCESSORIES THEREFOR, AND METHODS OF MANUFACTURE AND USE THEREOF

(71) Applicant: SRAM, LLC, Chicago, IL (US)

(72) Inventors: Laurence John Wattrus, Santa Monica, CA (US); Evan Charles Huggins, Fairfield, IA (US); Robert David Martinez, San Francisco, CA (US); Zakery Allen Koster, Brooklyn, NY (US); Paul Thomas Reamey, Brooklyn, NY (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/994,973

(22) Filed: Nov. 28, 2022

(65) Prior Publication Data

US 2023/0192217 A1    Jun. 22, 2023

Related U.S. Application Data

(63) Continuation of application No. 16/501,141, filed on May 28, 2020, now Pat. No. 11,554,827.

(51) Int. Cl.
*B62J 45/00* (2020.01)
*F16B 2/10* (2006.01)
*F16M 13/02* (2006.01)

(52) U.S. Cl.
CPC ............. *B62J 45/00* (2020.02); *F16B 2/10* (2013.01); *F16M 13/022* (2013.01); *F16M 2200/06* (2013.01)

(58) Field of Classification Search
None
See application file for complete search history.

(56) References Cited

U.S. PATENT DOCUMENTS

| | | | |
|---|---|---|---|
| 5,332,183 A | 7/1994 | Kagayama | |
| 5,735,441 A * | 4/1998 | Fujimoto | B62J 11/00 224/420 |
| 6,711,966 B2 | 3/2004 | Chuang | |
| 8,132,700 B2 * | 3/2012 | Dacko | B62J 11/00 224/427 |
| 8,887,975 B1 * | 11/2014 | Basile | B62J 11/00 224/452 |
| 8,998,048 B1 * | 4/2015 | Wu | F16M 13/02 224/443 |

(Continued)

FOREIGN PATENT DOCUMENTS

JP    2013087862 A1    5/2013

*Primary Examiner* — Monica E Millner

(57) ABSTRACT

This disclosure discloses various brackets with various mounting interfaces for engaging (e.g., mechanically) with various surfaces that are correspondingly configured. For example, one of such brackets can clamp onto a bar (e.g., a handlebar of a vehicle) and then an electronic device (e.g., a smartphone, a tablet, a dedicated navigational unit) can removably secure (e.g., mate) to that bracket. This form of removable securing can be via that bracket having a latch configured to engage a detent of the electronic device (or vice versa) in order to linearly mount the electronic device onto the bracket (or vice versa) and disengage the detent in order rotationally unmount the electronic device from the bracket (or vice versa).

12 Claims, 28 Drawing Sheets

(56) References Cited

U.S. PATENT DOCUMENTS

| | | | |
|---|---|---|---|
| 9,402,016 B1* | 7/2016 | Hidalgo | H04N 23/50 |
| 10,189,525 B2* | 1/2019 | Allen | B62J 9/21 |
| 10,422,474 B2* | 9/2019 | Bacallao | B62B 3/1428 |
| 11,029,734 B2* | 6/2021 | Hawkins, III | G06F 1/1632 |
| 11,303,143 B2* | 4/2022 | Taylor | H02J 50/10 |
| 2003/0106974 A1 | 6/2003 | Guertin | |
| 2004/0204169 A1 | 10/2004 | Goradesky | |
| 2008/0314941 A1 | 12/2008 | Knych | |
| 2009/0032561 A1* | 2/2009 | Dacko | B62J 11/00 224/441 |
| 2010/0084527 A1 | 4/2010 | Lau | |
| 2013/0098959 A1* | 4/2013 | Onogi | B62J 50/225 224/419 |
| 2014/0061270 A1* | 3/2014 | Richter | B62J 11/00 224/420 |
| 2014/0263509 A1* | 9/2014 | Oquendo | B62J 11/00 224/555 |
| 2015/0183478 A1* | 7/2015 | Tate | B62J 11/00 29/428 |
| 2015/0351531 A1* | 12/2015 | Dalton | F16M 13/027 248/558 |
| 2016/0031381 A1* | 2/2016 | Lin | B62J 50/225 224/548 |
| 2016/0368557 A1* | 12/2016 | Downes | F16B 2/18 |
| 2018/0203488 A1* | 7/2018 | Hawkins, III | B62J 45/20 |
| 2019/0382067 A1* | 12/2019 | Mühle | B62M 6/90 |
| 2021/0249880 A1* | 8/2021 | Taylor | H02J 7/02 |

* cited by examiner

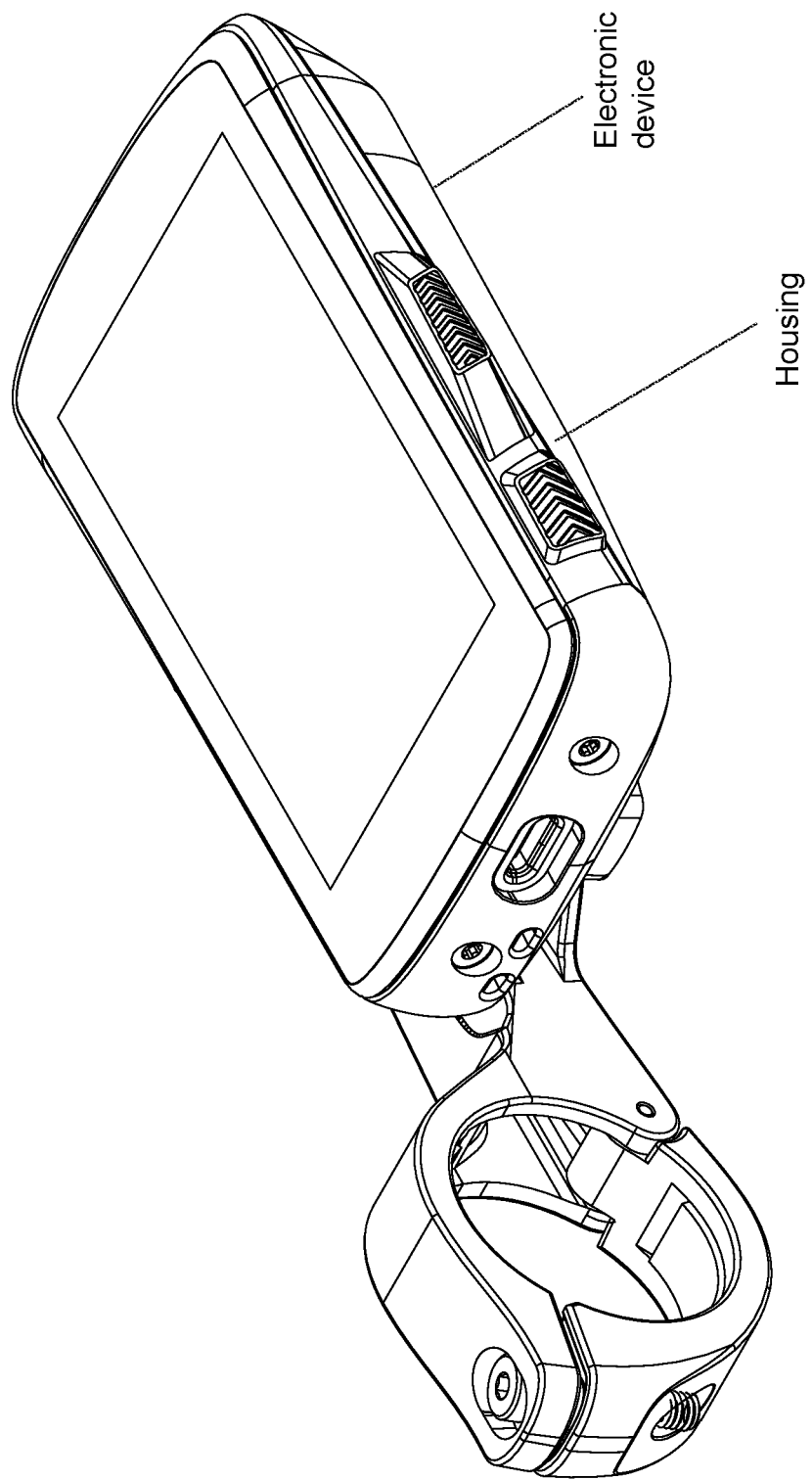

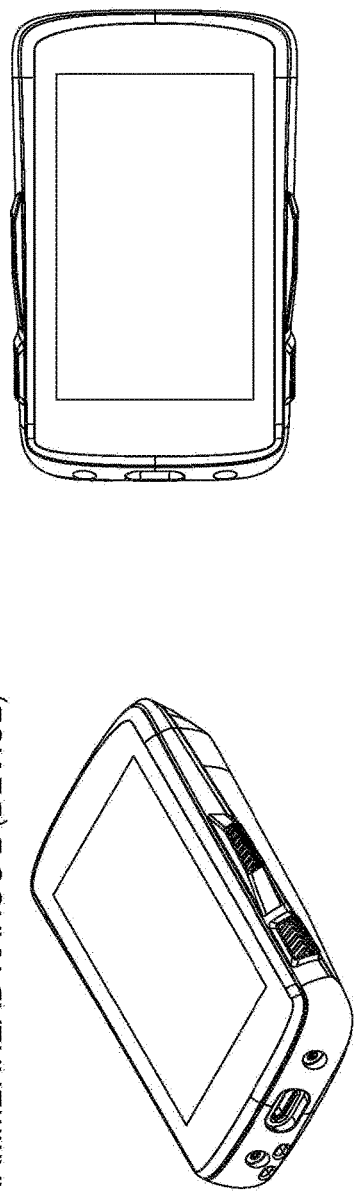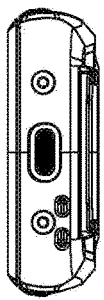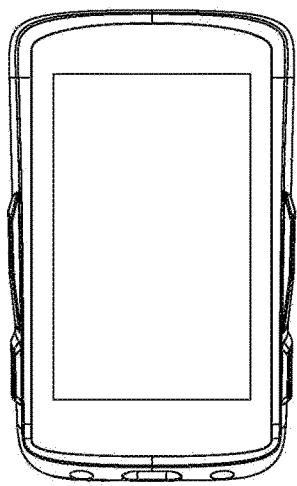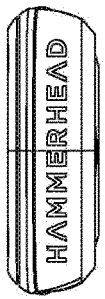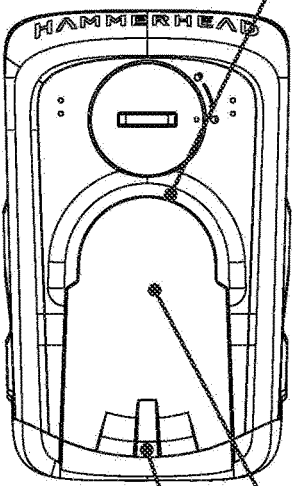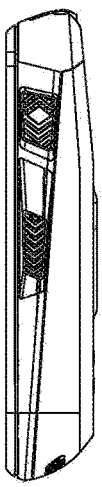

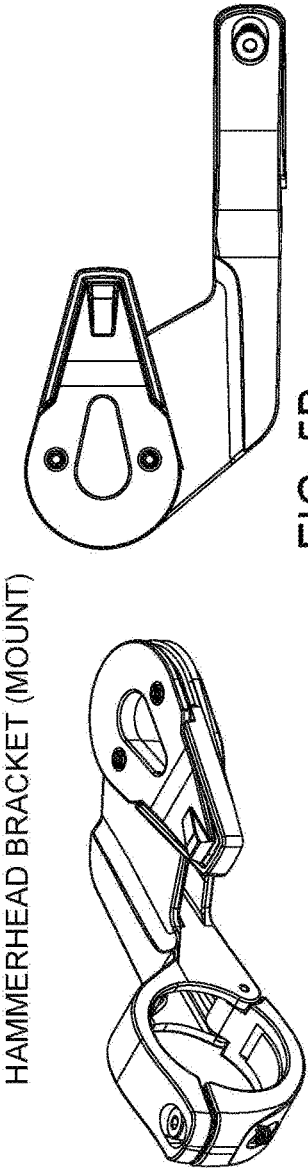
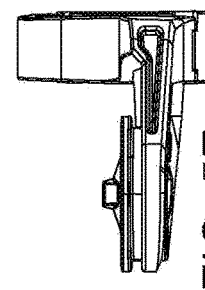
FIG. 5E
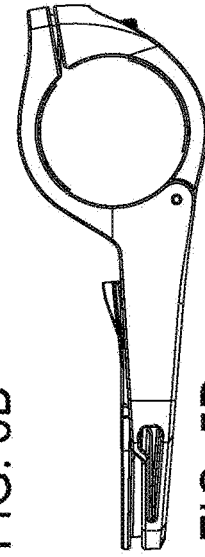
FIG. 5B
FIG. 5D
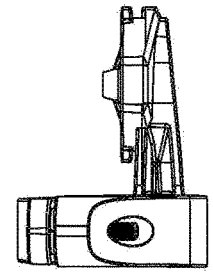
FIG. 5C
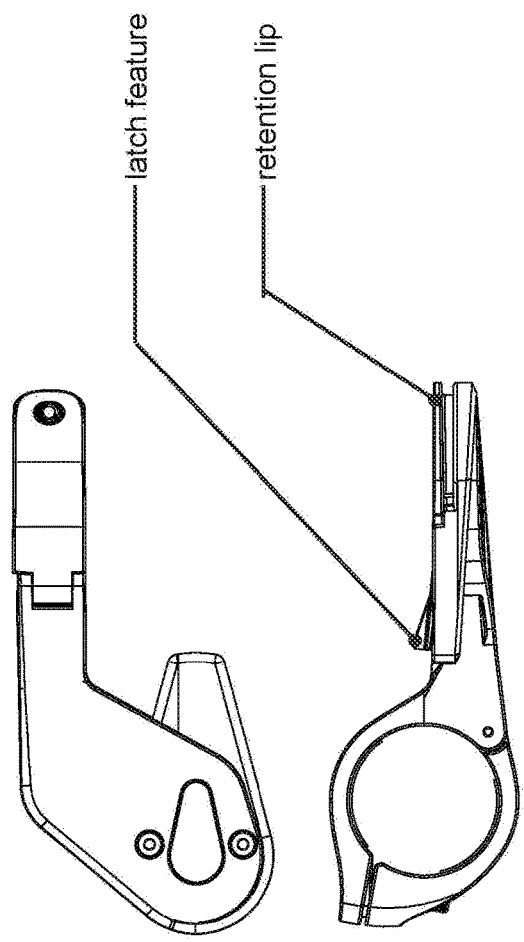
FIG. 5F
FIG. 5G
HAMMERHEAD BRACKET (MOUNT)
FIG. 5A
latch feature
retention lip

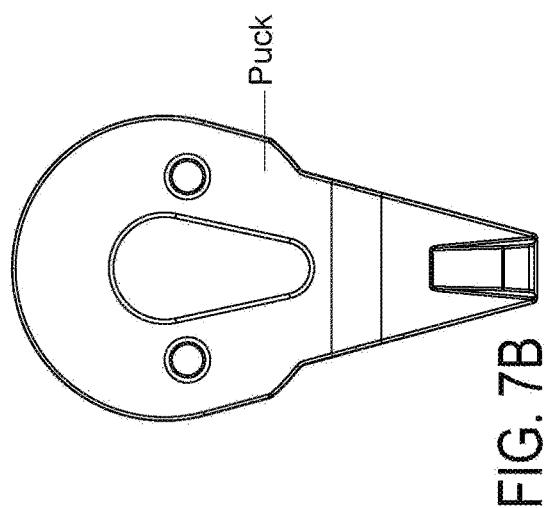
FIG. 7B
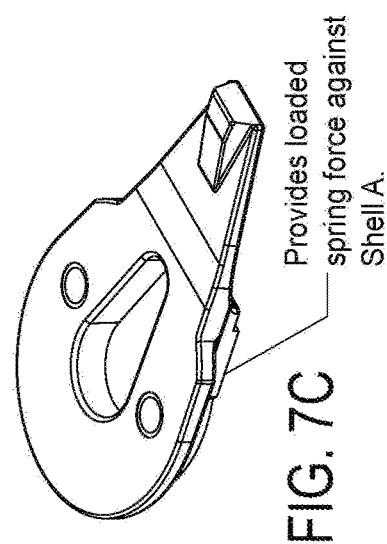
Provides loaded spring force against Shell A.
FIG. 7C
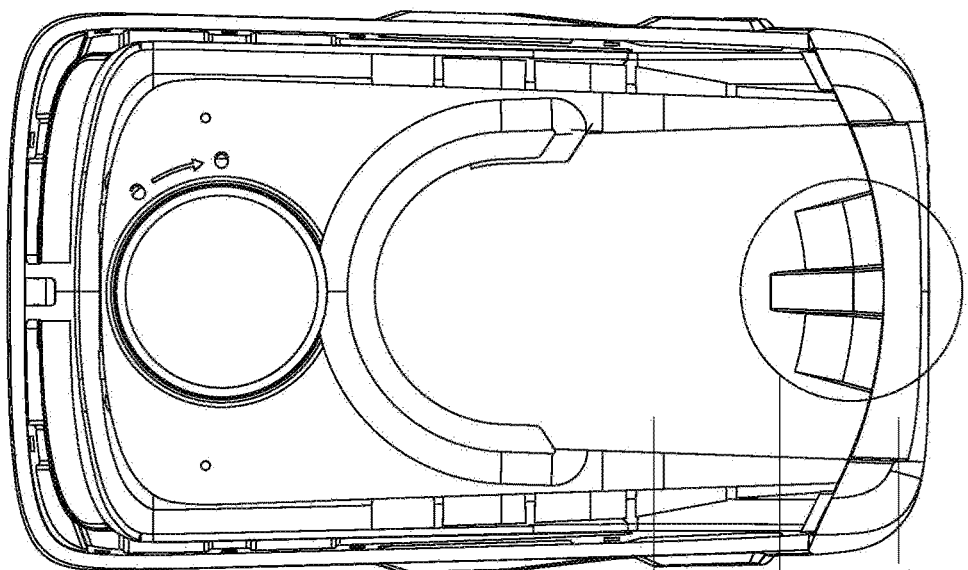
FIG. 7A
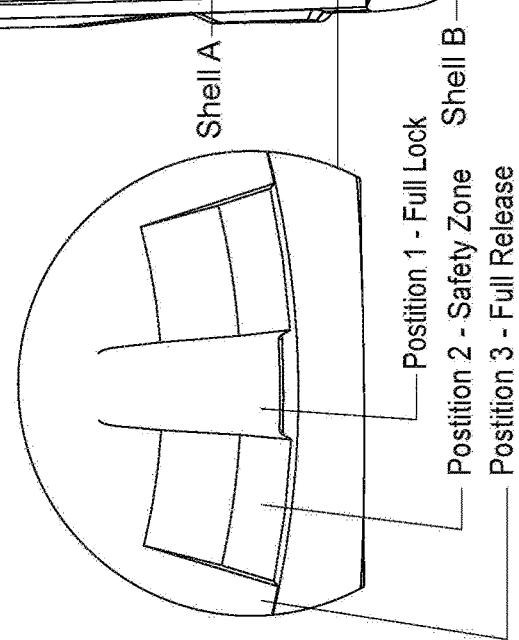
Shell A
Shell B
Postition 1 - Full Lock
Position 2 - Safety Zone
Position 3 - Full Release

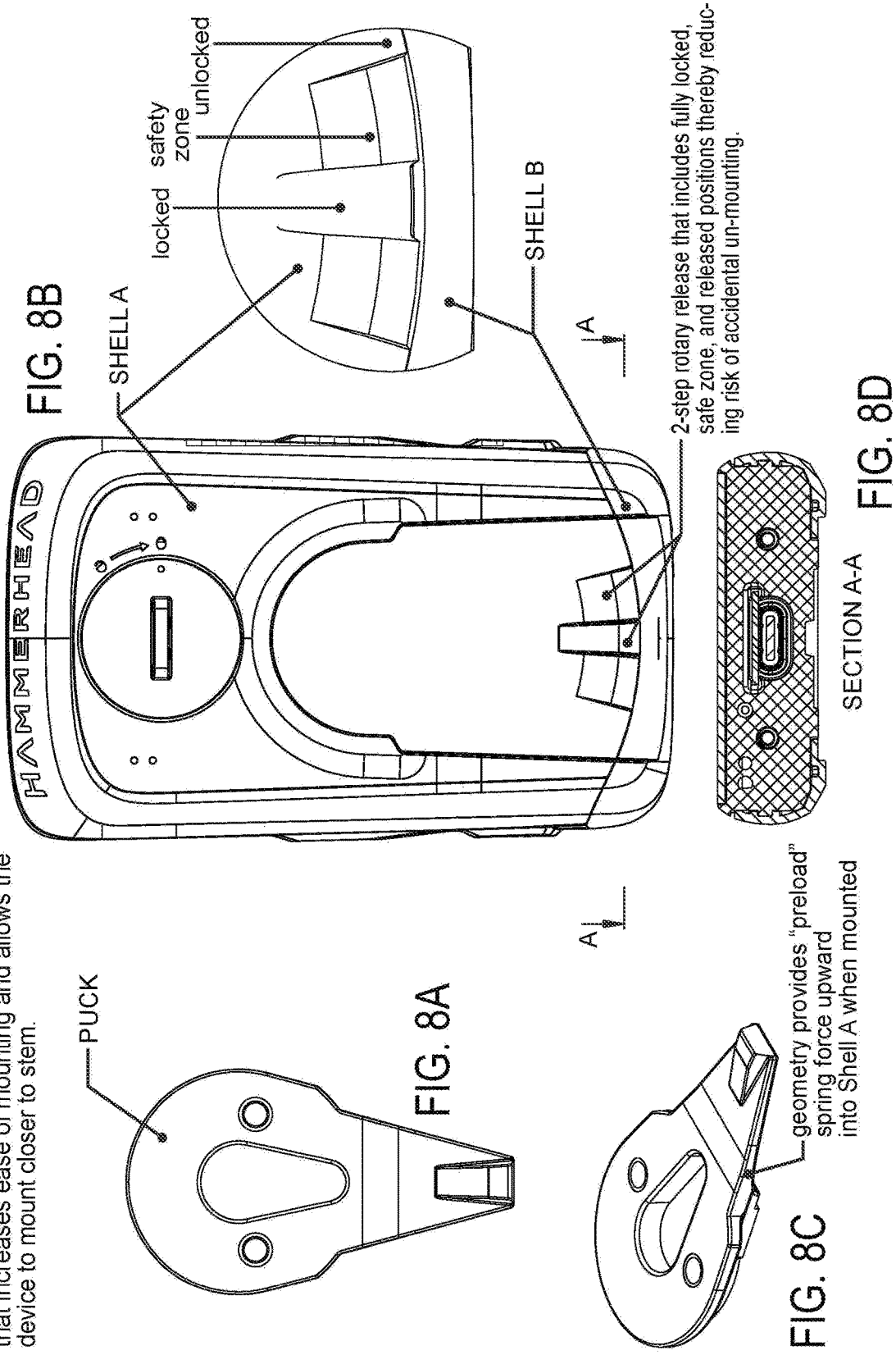

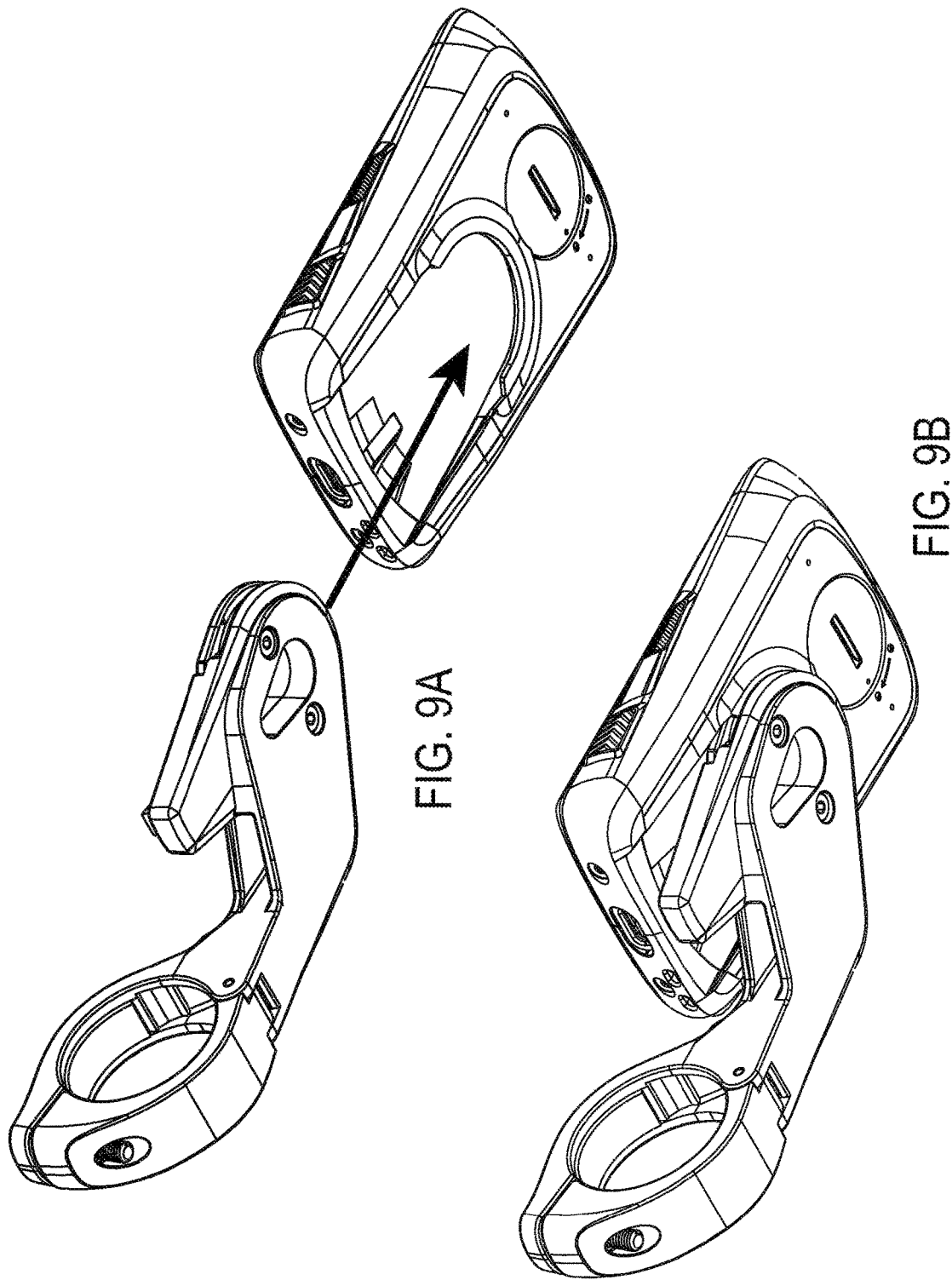

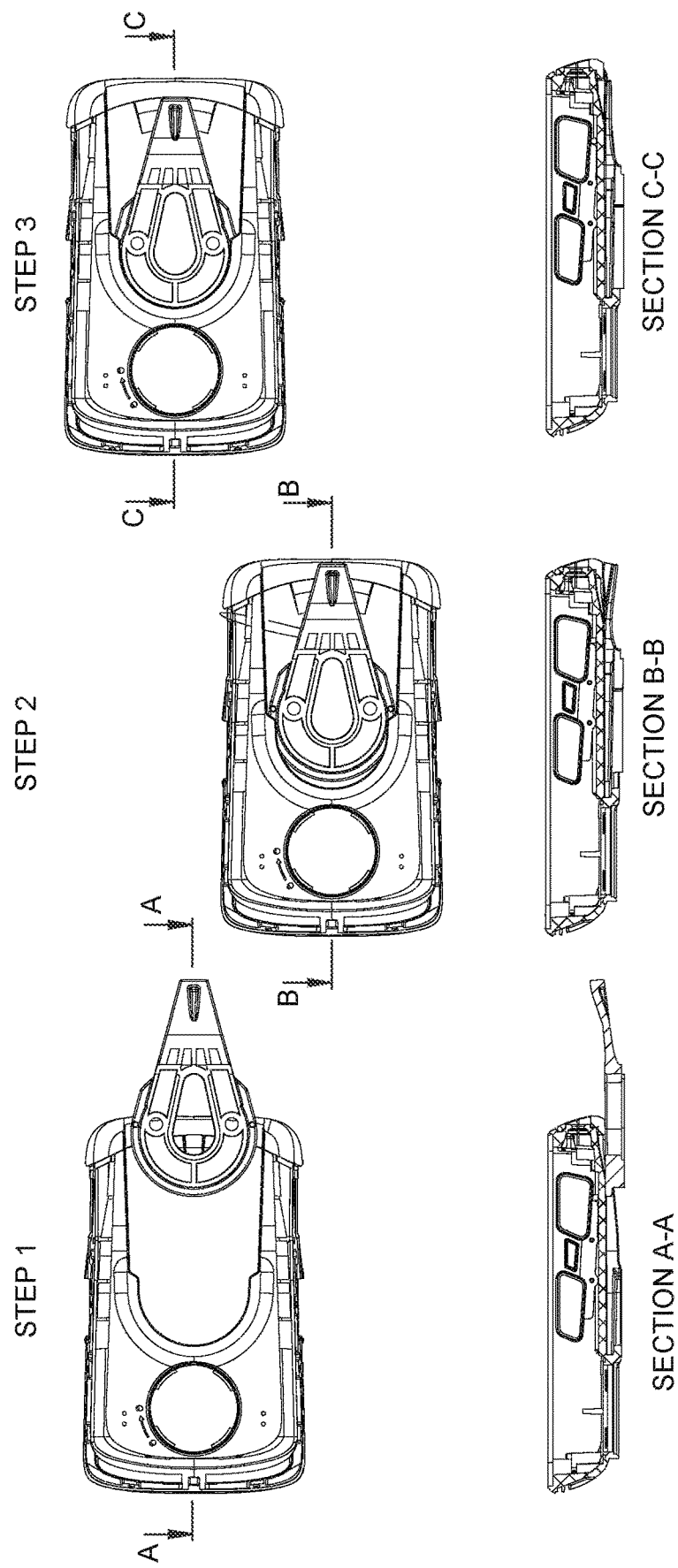

DEVICE REMOVAL - ROTARY ACTION

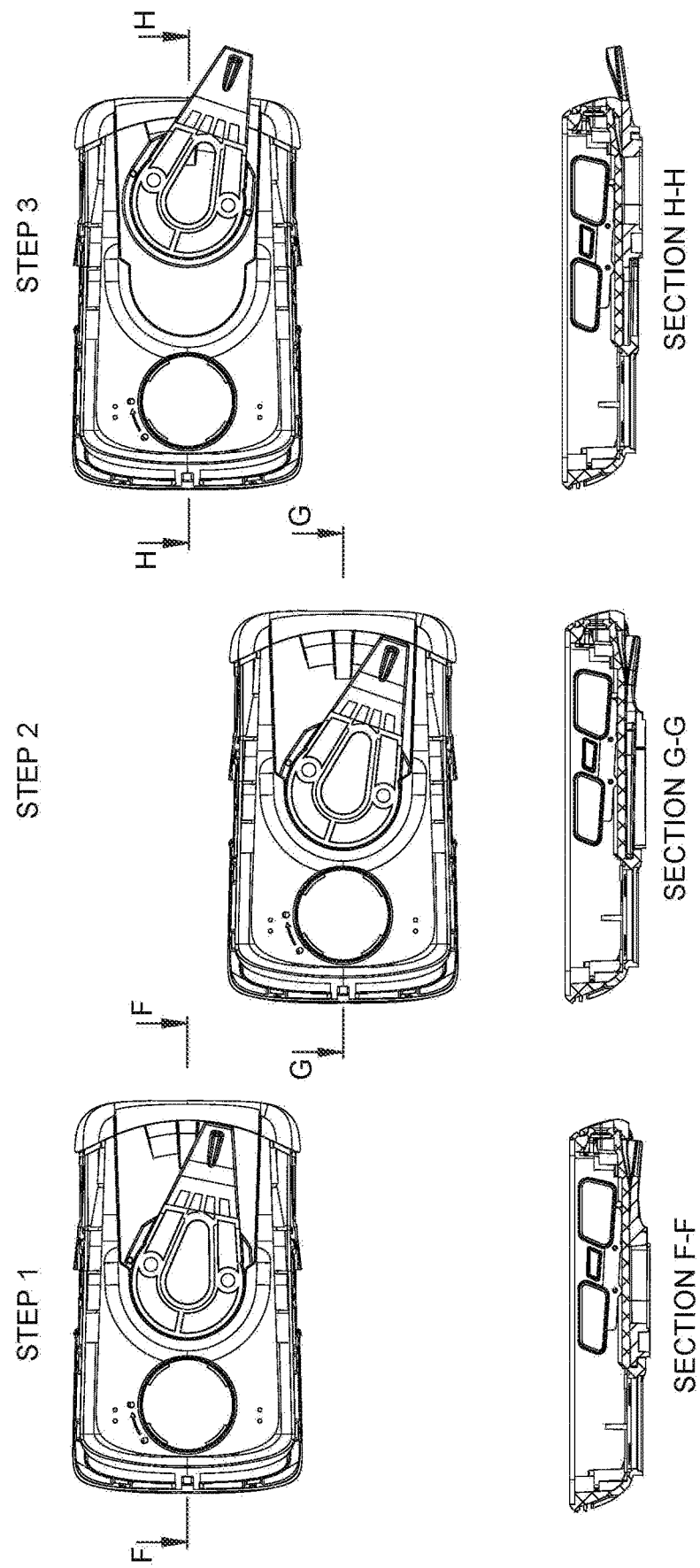

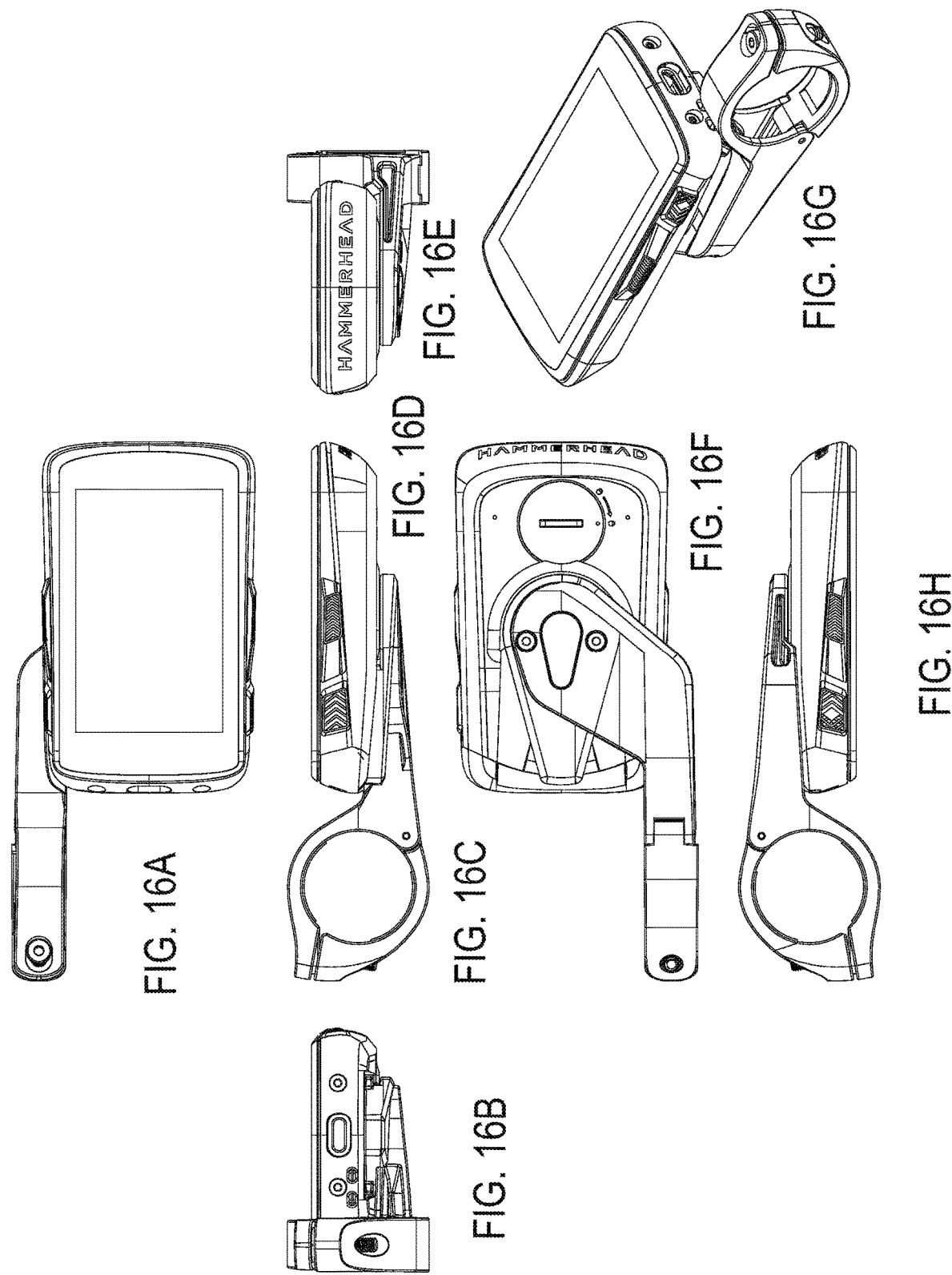

ELECTRIFICATION

The Karoo 2 coupling interface is configured to interface with a fully integrated cycling technology system in various iterations. This may include sensors, monitors, batteries, data processors, lights, and any number of other sub-systems. The docking port may or may not be housed within an "aero" style integrated handlebar and stem. Specific features intended to facilitate this include three instances:

FIG. 25

INSTANCE A: USB TYPE-C

Linear mounting allows for docking into a USB type C or other power/data port in both stationary indoor bicycles and traditional outdoor bicycles. Loaded tab latching system allows for linear un-mounting with the addition of a user actuated vertical release lever.

FIG. 26

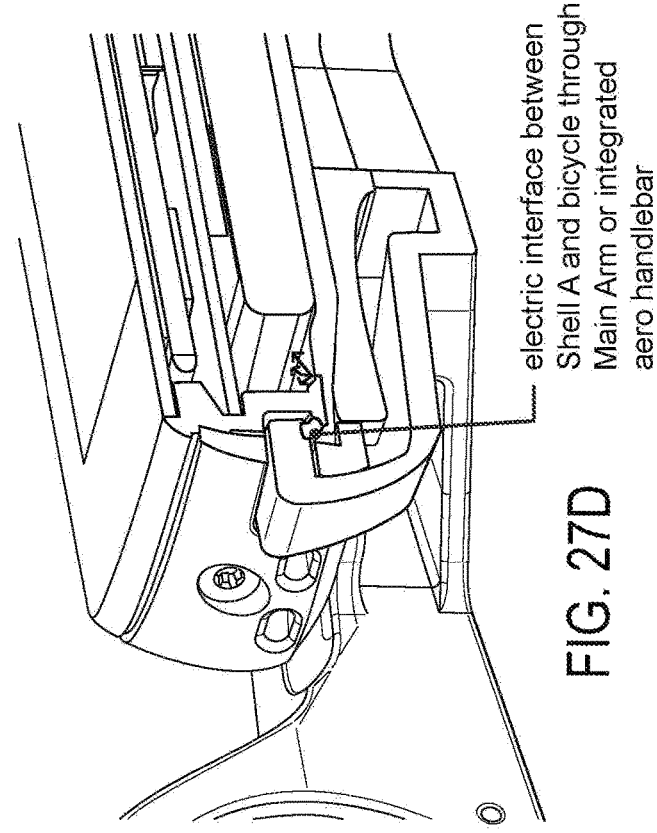
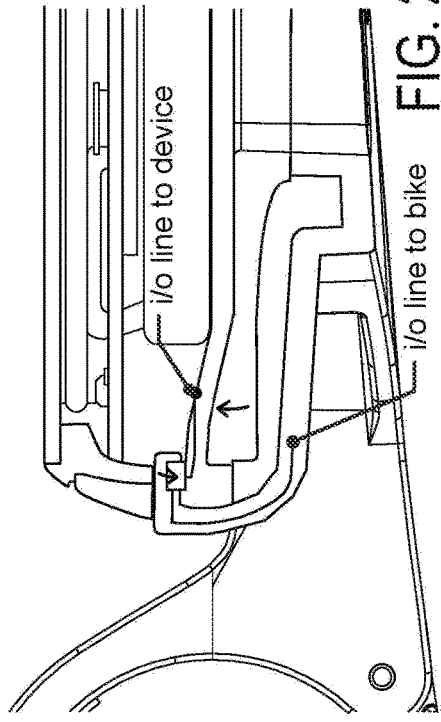
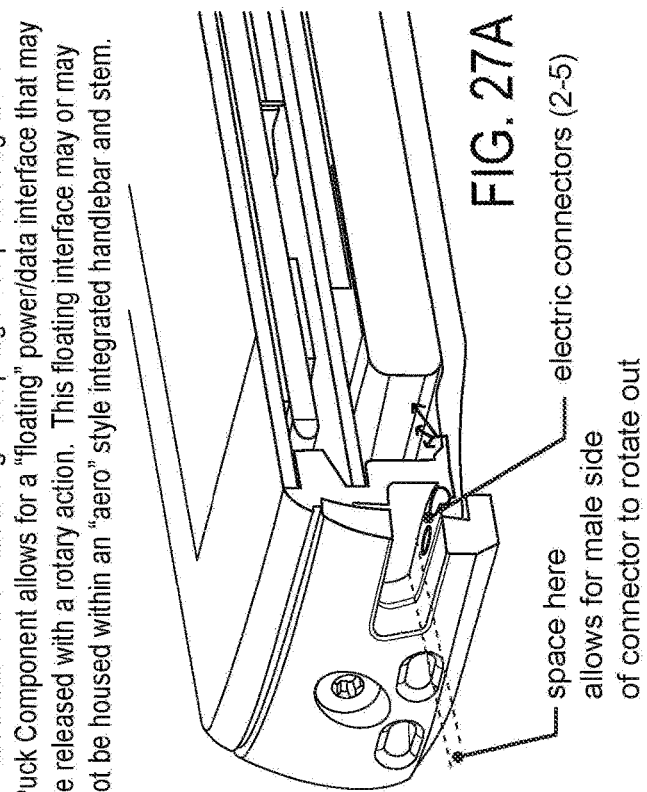

INSTANCE B: INTERFACE 1
Combination of linear mounting and spring force preloading in the Puck Component allows for a "floating" power/data interface that may be released with a rotary action. This floating interface may or may not be housed within an "aero" style integrated handlebar and stem.

FIG. 27A — electric connectors (2-5); space here allows for male side of connector to rotate out FIG. 27B — i/o line to device; i/o line to bike FIG. 27C — possible instance of bike side electrical connector FIG. 27D — electric interface between Shell A and bicycle through Main Arm or integrated aero handlebar

MOUNTING INTERFACES, DEVICES THEREWITH, ACCESSORIES THEREFOR, AND METHODS OF MANUFACTURE AND USE THEREOF

BACKGROUND

An outdoor bicycle may have a handlebar onto which a bracket may be secured. The bracket may have a mounting interface configured to engage with an accessory (e.g., a smartphone, a dedicated navigation device) such that the bracket can securely hold the accessory when the outdoor bicycle is ridden. However, the mounting interface may not allow the accessory to be easily mounted thereon and dis-mounted therefrom.

SUMMARY

In an embodiment, a device comprises: a clamp; an arm extending from the clamp; a plate supported by the arm, wherein the plate includes an exterior surface and a latch, wherein the latch extends away from the exterior surface such that the latch is configured to engage a detent of a housing in order to linearly mount the housing onto the plate and disengage the detent in order rotationally unmount the housing from the plate.

In an embodiment, a method comprises: causing a clamp to clamp onto a handlebar of a vehicle; causing an arm extend from the clamp as the clamp clamps onto the handlebar; causing a plate to be supported by the arm as the clamp clamps onto the handlebar, wherein the plate includes an exterior surface and a latch, wherein the latch extends away from the exterior surface; and causing the latch to engage a detent of a housing in order to linearly mount the housing onto the plate.

In an embodiment, a method comprises: causing a clamp to clamp onto a handlebar of a vehicle; causing an arm extend from the clamp as the clamp clamps onto the handlebar; causing a plate to be supported by the arm as the clamp clamps onto the handlebar, wherein the plate includes an exterior surface and a latch, wherein the latch extends away from the exterior surface; and causing the latch to disengage a detent of housing linearly mounted on the plate in order to rotationally unmount the housing from the plate.

DESCRIPTION OF DRAWINGS

FIG. 2 shows an embodiment of a bracket holding a housing according to this disclosure.

FIGS. 3A-3G show an embodiment of an electronic device having a housing according to this disclosure.

FIGS. 5A-5G show an embodiment of a bracket with a mounting interface according to this disclosure.

FIGS. 7A-8D show an embodiment of plate with a latch and a housing with a detent and a plurality of projections according to this disclosure.

FIGS. 9A-10C show an embodiment of a bracket being linearly mounted onto a housing according to this disclosure.

FIGS. 12A-15C show an embodiment of a housing being rotationally unmounted from a bracket according to this disclosure.

FIGS. 16A-16H show an embodiment of a bracket holding an electronic device having a housing according to this disclosure.

FIGS. 25-28B show an embodiment of a housing and a bracket being in electrical communication with each other according to this disclosure.

DETAILED DESCRIPTION

Figure 1:
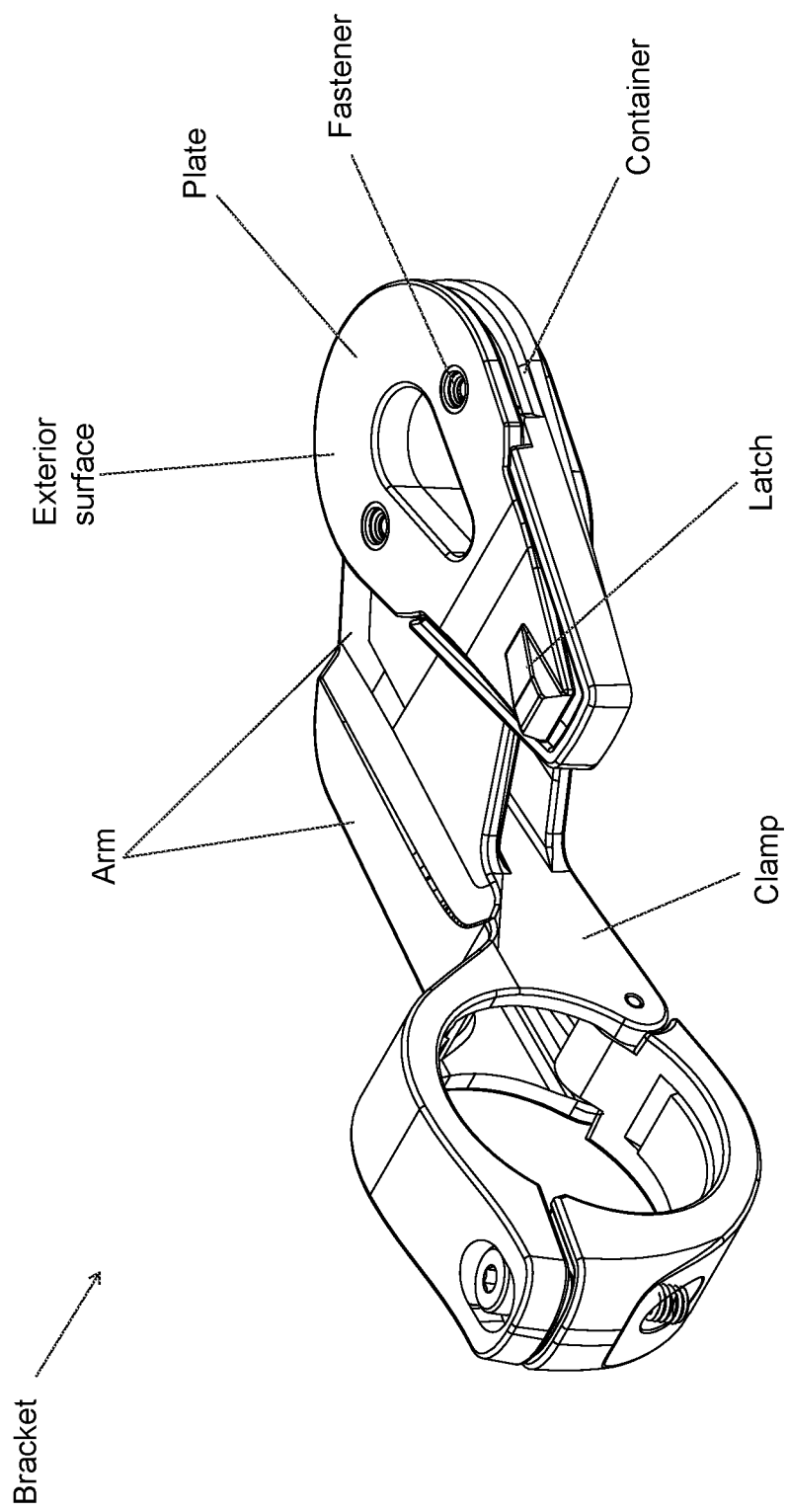
FIG. 1 shows an embodiment of a bracket with a mounting interface according to this disclosure.

Generally, this disclosure discloses various brackets with various mounting interfaces for engaging (e.g., mechanically) with various surfaces that are correspondingly configured. For example, one of such brackets can clamp onto a bar (e.g., a handlebar of a vehicle) and then an electronic device (e.g., a smartphone, a tablet, a dedicated navigational unit) can removably secure (e.g., mate) to that bracket. This form of removable securing can be via that bracket having a latch configured to engage a detent of the electronic device (or vice versa) in order to linearly mount the electronic device onto the bracket (or vice versa) and disengage the detent in order rotationally unmount the electronic device from the bracket (or vice versa). Note that this disclosure may be embodied in many different forms and should not be construed as necessarily being limited to various embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected," or "coupled" to another element, then the element can be directly on, connected, or coupled to another element or intervening elements can be present, including indirect or direct variants. In contrast, when an element is referred to as being "directly connected" or "directly coupled" to another element, then there are no intervening elements present.

As used herein, various singular forms "a," "an" and "the" are intended to include various plural forms as well, unless specific context clearly indicates otherwise.

As used herein, various presence verbs "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled artisans understand that typically there is no limit on number of items or terms in any combination, unless otherwise apparent from the context.

As used herein, unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense unless expressly so defined herein.

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" or "substantially" refers to a +/−10% variation from a nominal value/term. Such variation is always included in any given value/term provided herein, whether or not such variation is specifically referred thereto.

Features described with respect to certain embodiments may be combined in or with various some embodiments in any permutational or combinatory manner. Different aspects or elements of example embodiments, as disclosed herein, may be combined in a similar manner.

Although various terms first, second, third, and so forth can be used herein to describe various elements, components, regions, layers, or sections, these elements, components, regions, layers, or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain example embodiments can be combined and sub-combined in or with various other example embodiments. Also, different aspects or elements of example embodiments, as disclosed herein, can be combined and sub-combined in a similar manner as well. Further, some example embodiments, whether individually or collectively, can be components of a larger system, wherein other procedures can take precedence over or otherwise modify their application. Additionally, a number of steps can be required before, after, or concurrently with example embodiments, as disclosed herein. Note that any or all methods or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques or tolerances, are to be expected. Thus, various example embodiments of this disclosure should not be construed as necessarily limited to various particular shapes of regions illustrated herein, but are to include deviations in shapes that result, for example, from manufacturing.

Any or all elements, as disclosed herein, can be formed from a same, structurally continuous piece, such as being unitary, or be separately manufactured or connected, such as being an assembly or modules. Any or all elements, as disclosed herein, can be manufactured via any manufacturing processes, whether additive manufacturing, subtractive manufacturing, or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

FIG. 1 shows an embodiment of a bracket with a mounting interface according to this disclosure. In particular, the bracket includes a clamp, an arm extending from the clamp, a container extending from the arm, and a plate supported by the arm and covering the container. The container and the arm form a monolithic piece. The container avoids rotation relative to the arm. The plate is fastened to the container. The plate has a teardrop shape. The plate includes an exterior surface and a latch. The latch extends away from the exterior surface. The plate tapers toward the latch. The latch is triangular.

FIG. 2 shows an embodiment of a bracket holding a housing according to this disclosure. In particular, the housing of an electronic device (e.g., a smartphone, a tablet, a dedicated navigational unit).

FIG. 3 shows an embodiment of an electronic device having a housing according to this disclosure. In particular, the housing includes a mounting surface, a retention lip, a detent, a first protrusion, and a second protrusion. The detent is interposed between the first protrusion and the second protrusion.

Figure 4:
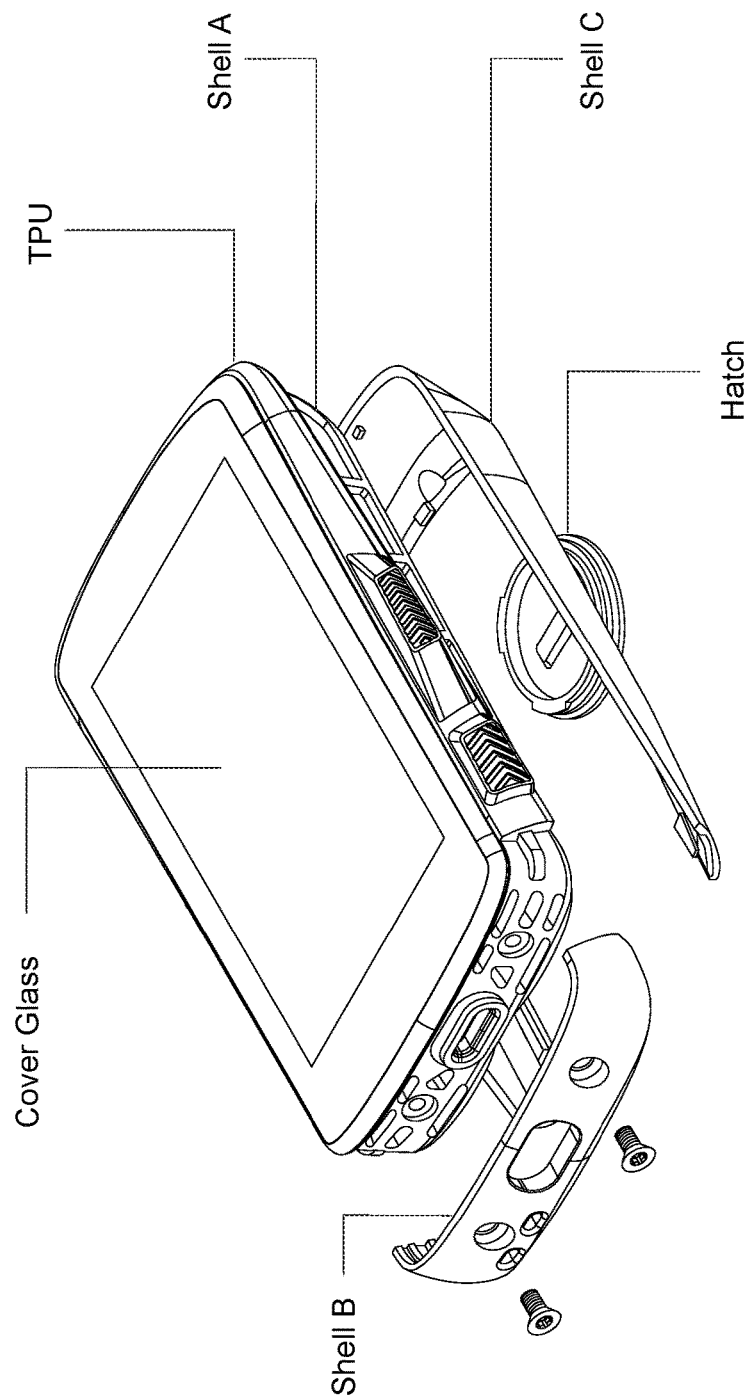
FIG. 4 shows an embodiment of a plurality of parts of an electronic device having a housing according to this disclosure.
Figure 6:
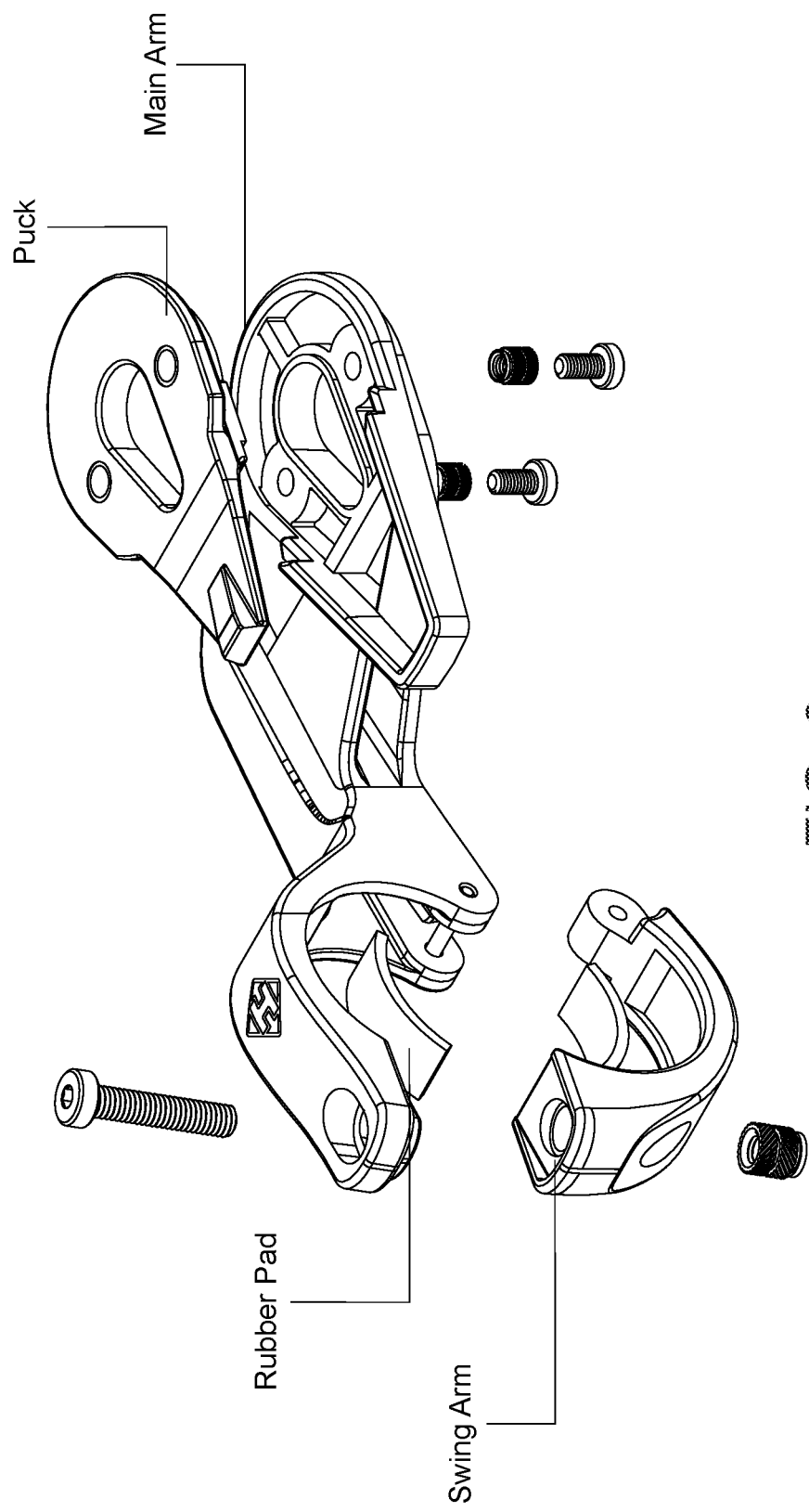
FIG. 6 shows an embodiment of a plurality of parts of a bracket with a mounting interface according to this disclosure.

FIG. 4 shows an embodiment of a plurality of parts of an electronic device having a housing according to this disclosure. FIG. 5 shows an embodiment of a bracket with a mounting interface according to this disclosure. FIG. 6 shows an embodiment of a plurality of parts of a bracket with a mounting interface according to this disclosure. FIGS. 7-8 show an embodiment of plate with a latch and a housing with a detent and a plurality of projections according to this disclosure. The latch is configured to engage the detent in order to linearly mount the housing onto the plate such that the plate provides an elastic force onto the housing.

FIGS. 9-10 show an embodiment of a bracket being linearly mounted onto a housing (or vice versa) according to this disclosure. Therefore, the latch extends away from the exterior surface such that the latch is configured to engage the detent in order to linearly mount the housing onto the plate. Likewise, the latch is configured to engage the detent in order to linearly mount the housing onto the plate based on the latch extending between the first protrusion and the second protrusion. Similarly, the latch is configured to engage the detent in order to linearly mount the housing onto the plate such that the plate engages the retention lip. Note that the latch and the detent complement each other in shape.

Figure 11A:
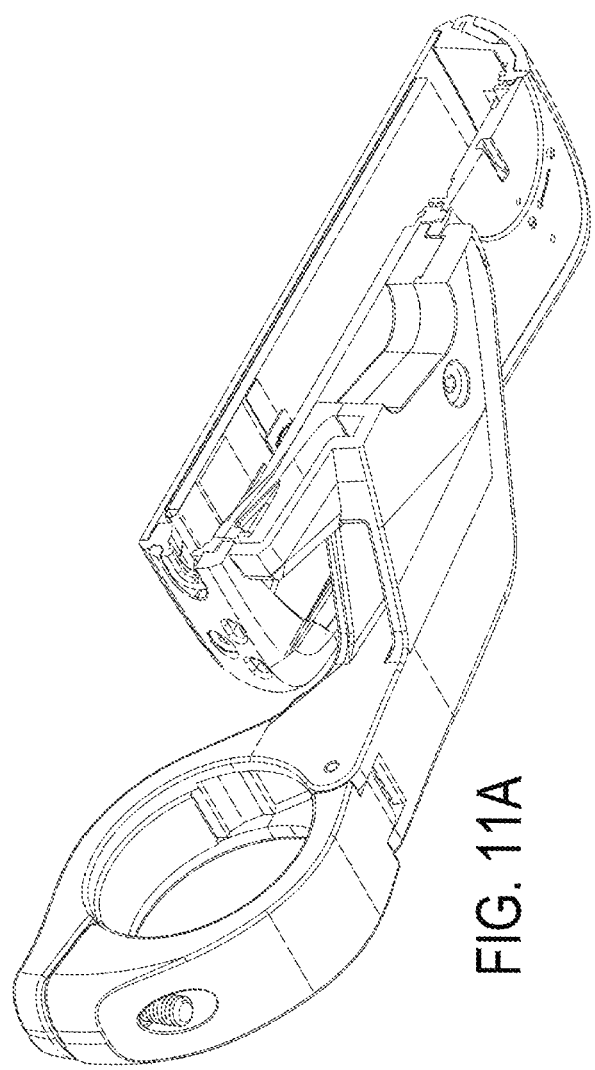
FIGS. 11A-11B show an embodiment of a bracket holding a housing according to this disclosure.
Figure 11B:
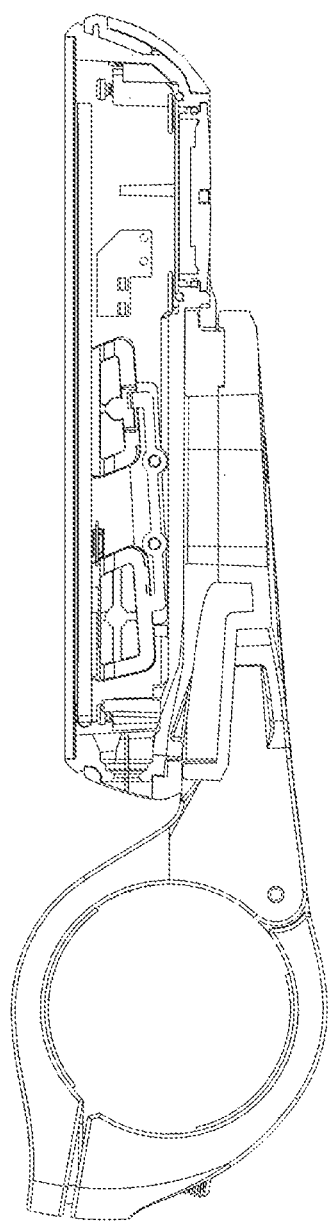
Figure 12C:
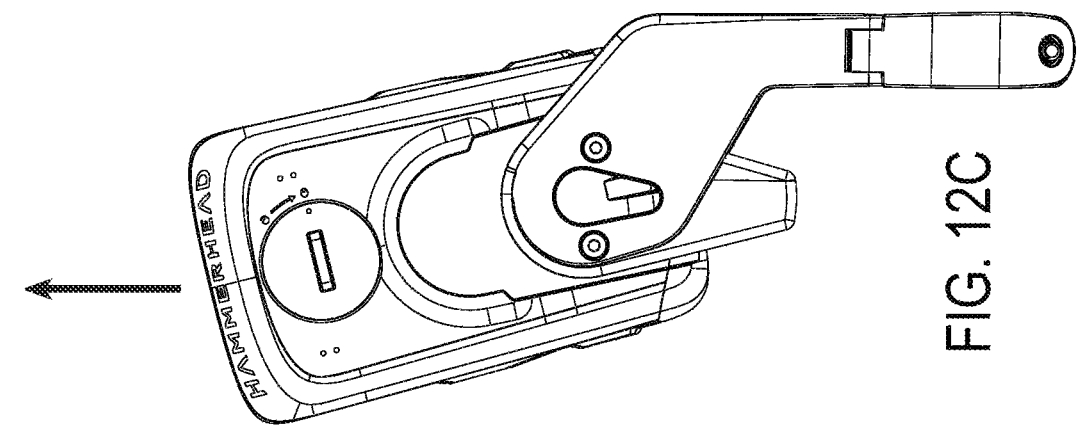
Figure 12B:
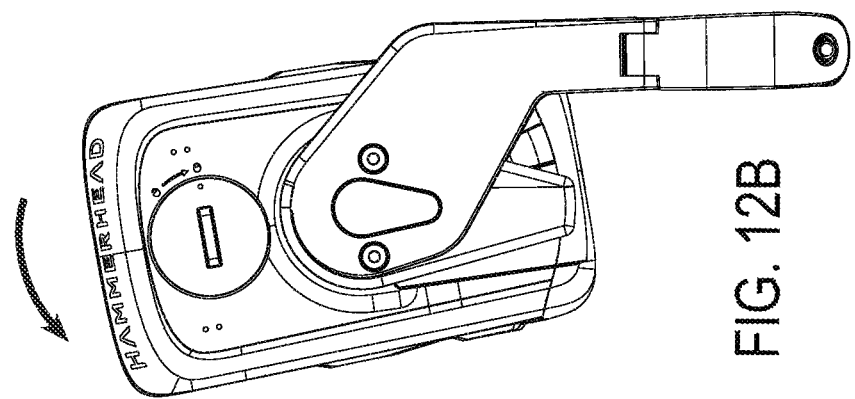
Figure 12A:
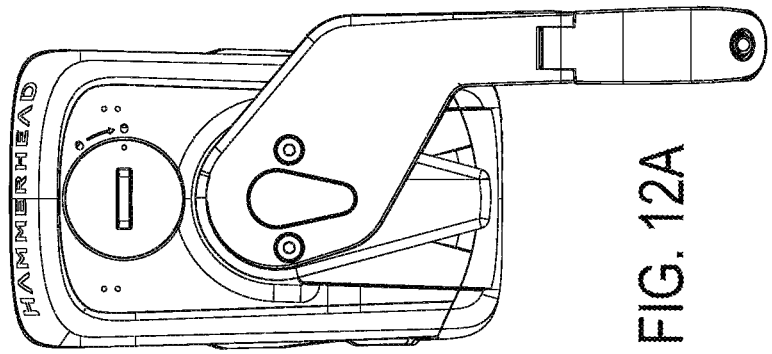
Figure 13C:
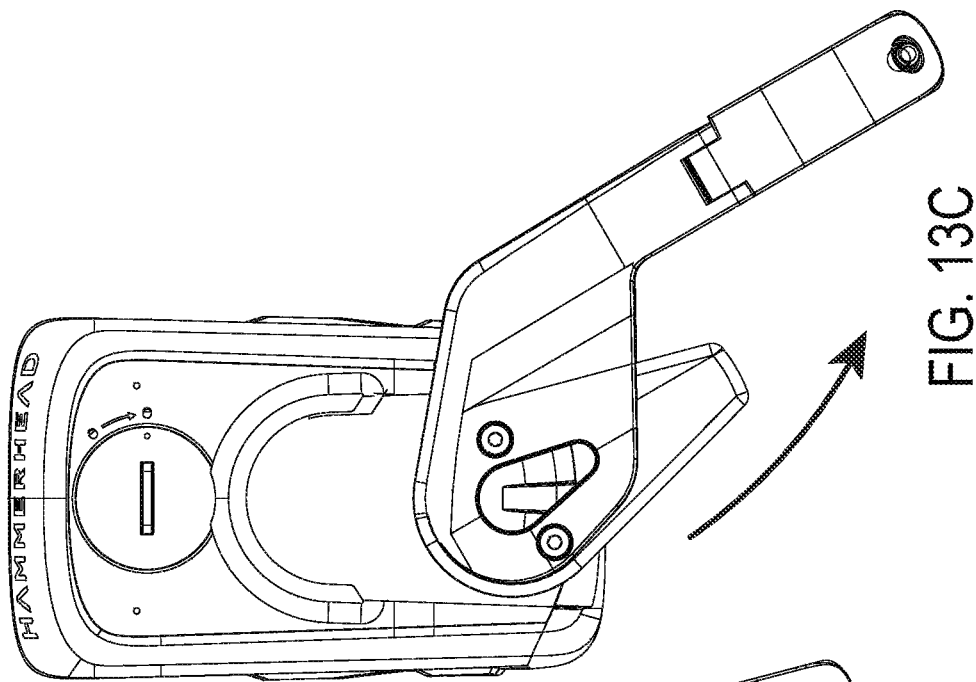
Figure 13B:
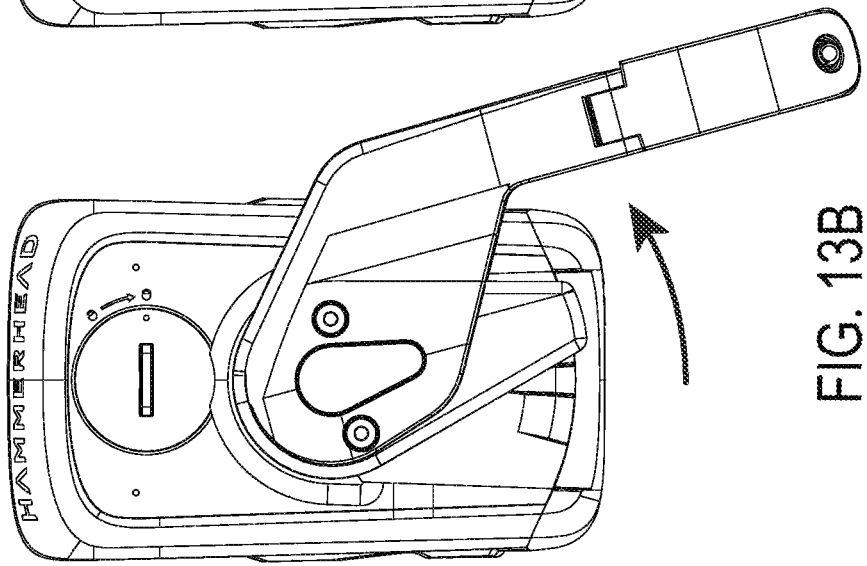
Figure 13A:
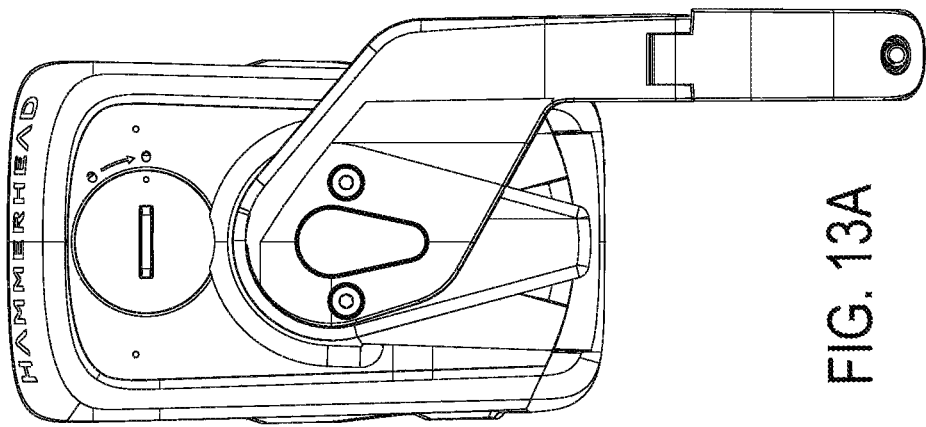
Figure 14C:
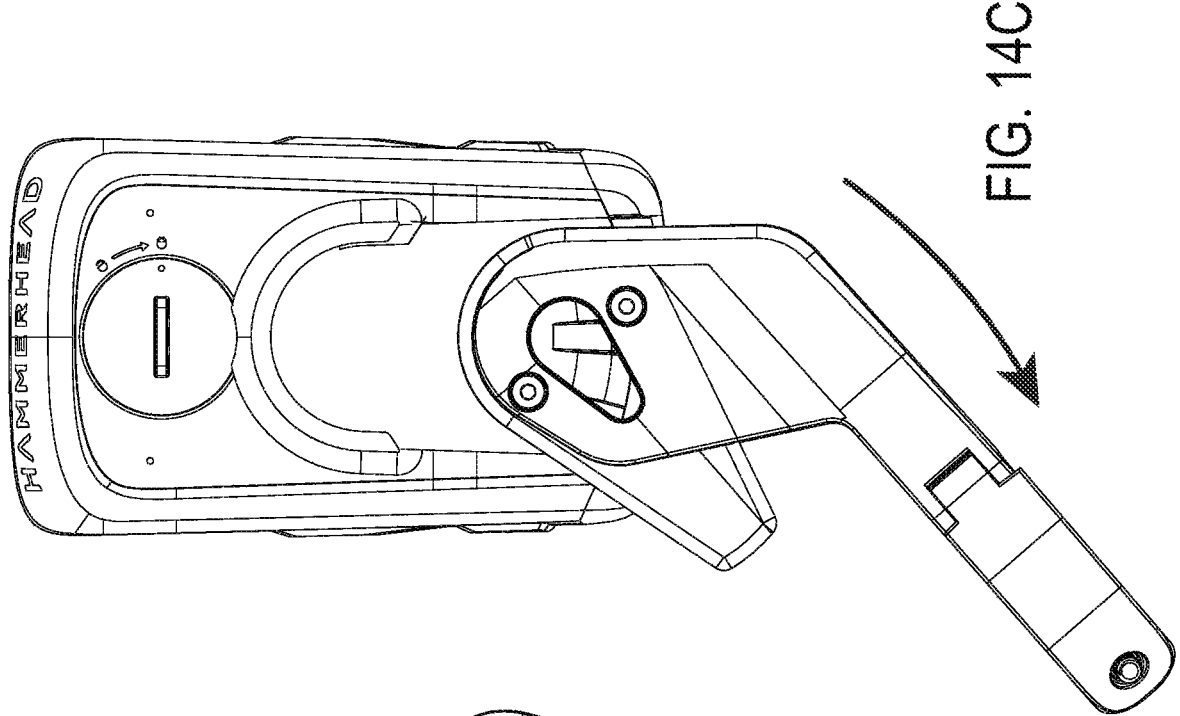
Figure 14B:
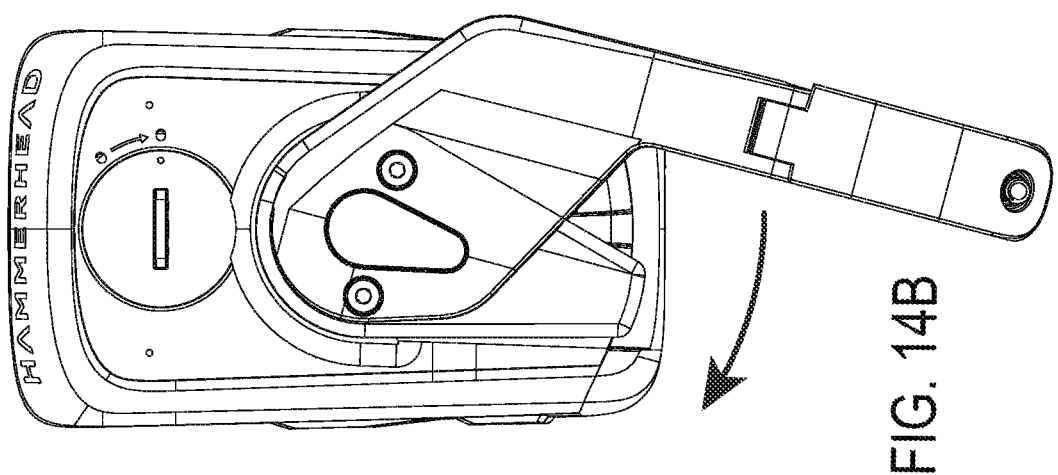
Figure 14A:
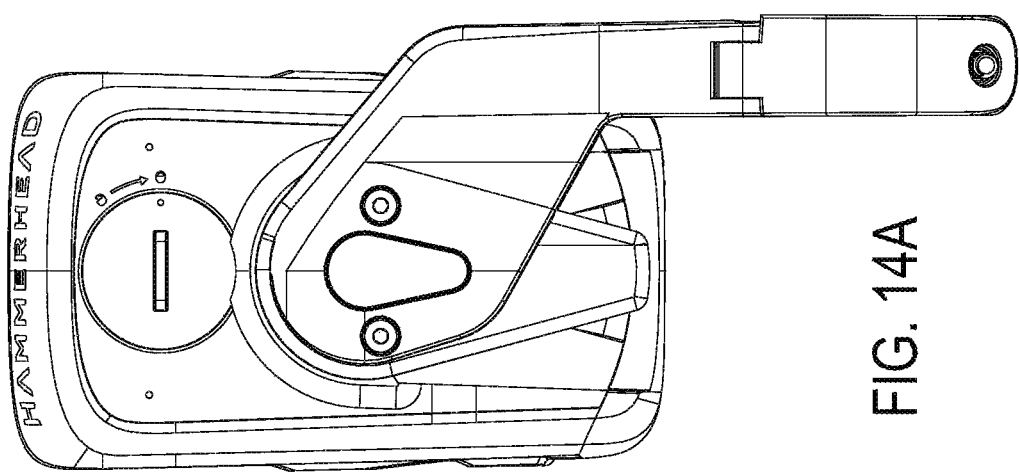
Figure 17:
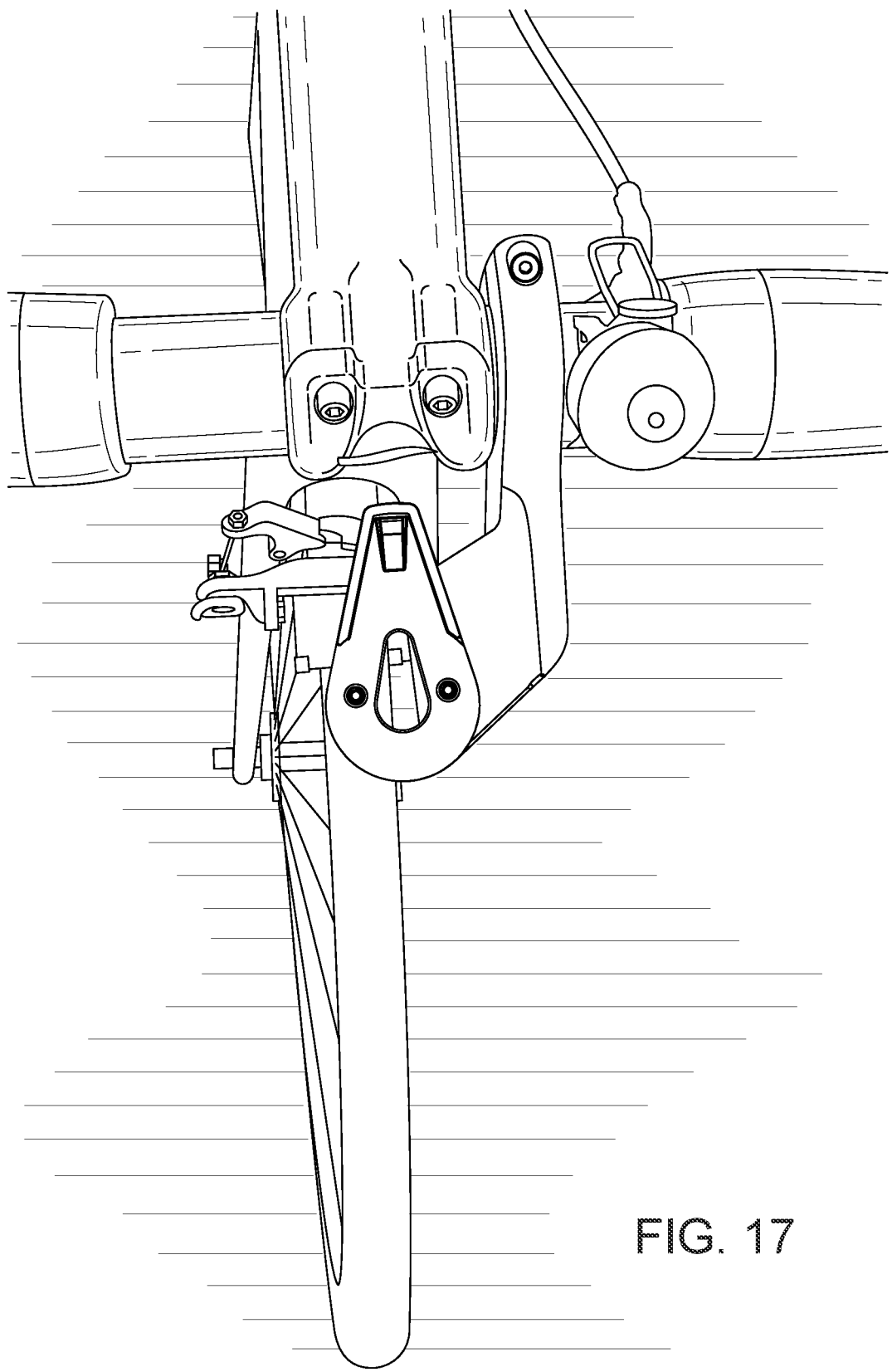
FIGS. 17-24 show an embodiment of a housing being linearly mounted onto a bracket and rotationally unmounted from the bracket according to this disclosure.
Figure 18:
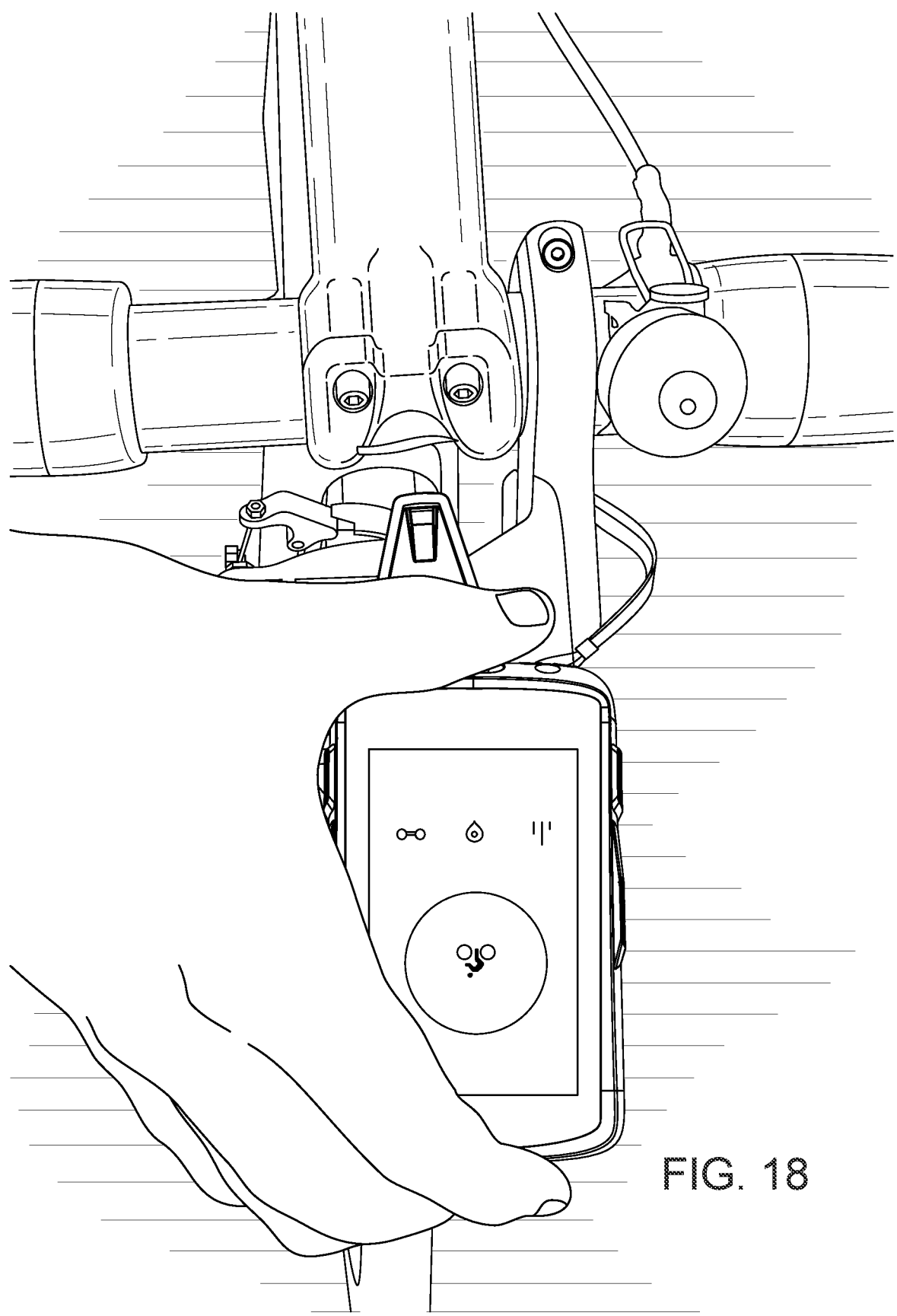
Figure 19:
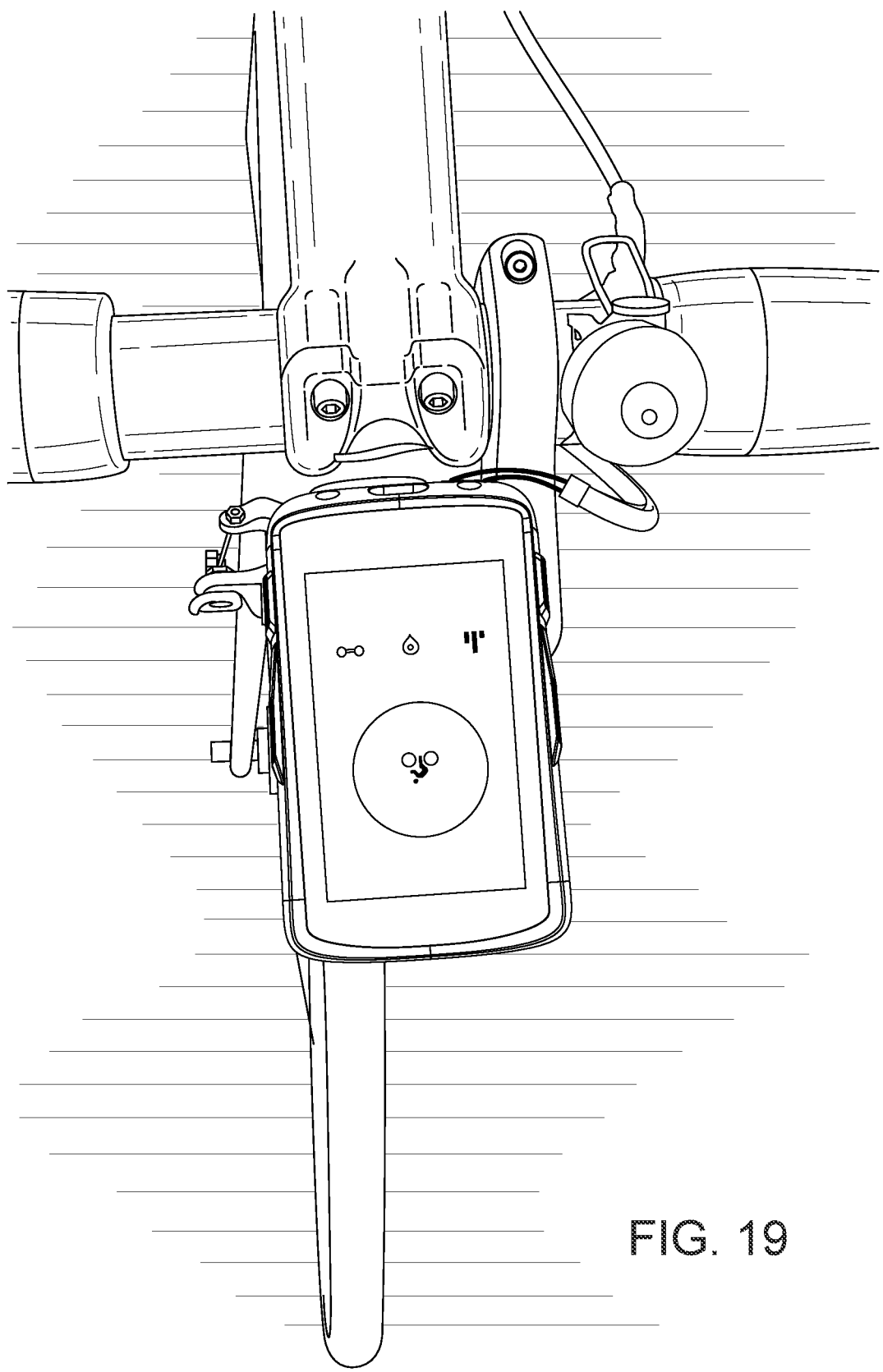
Figure 20:
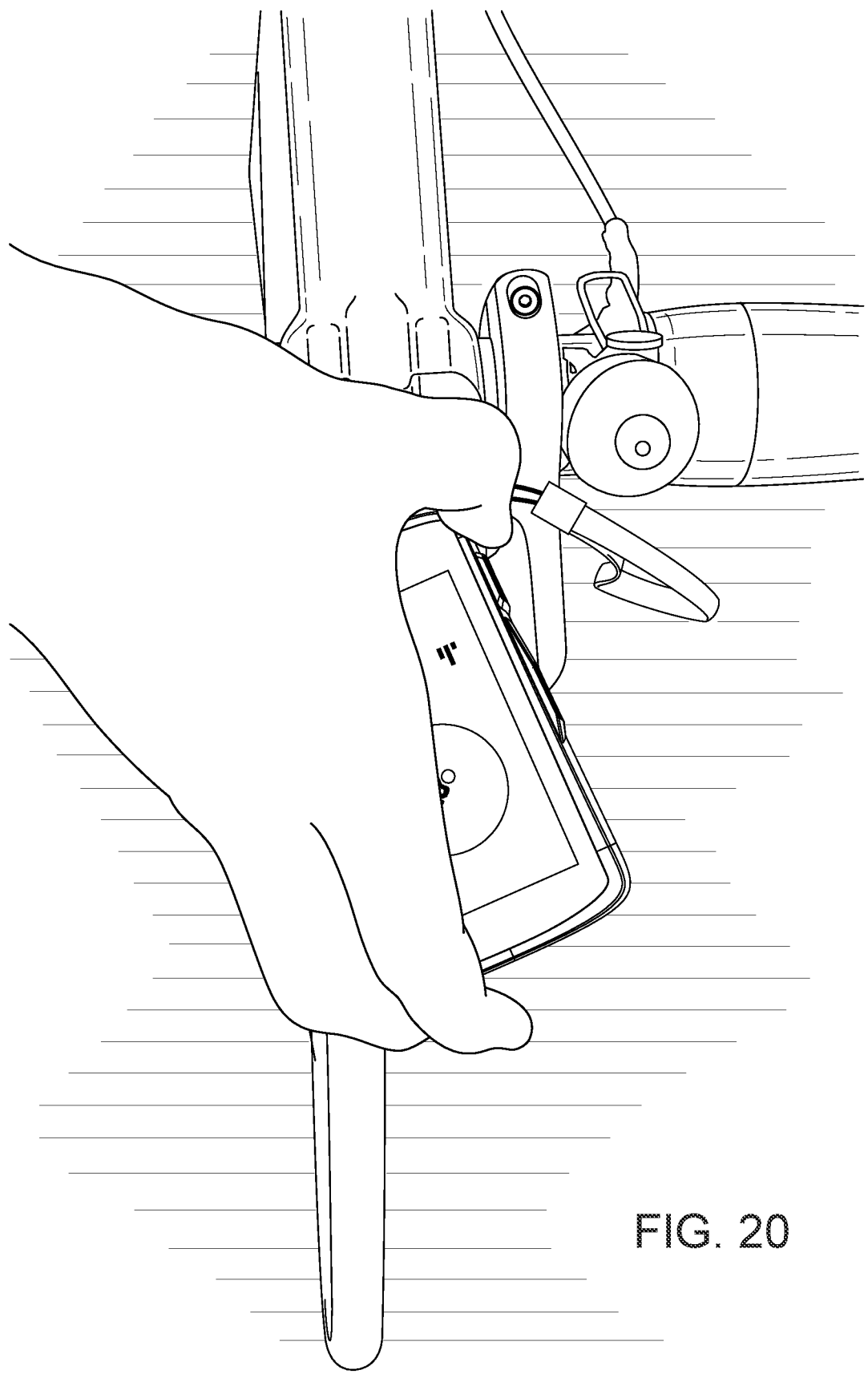
Figure 21:
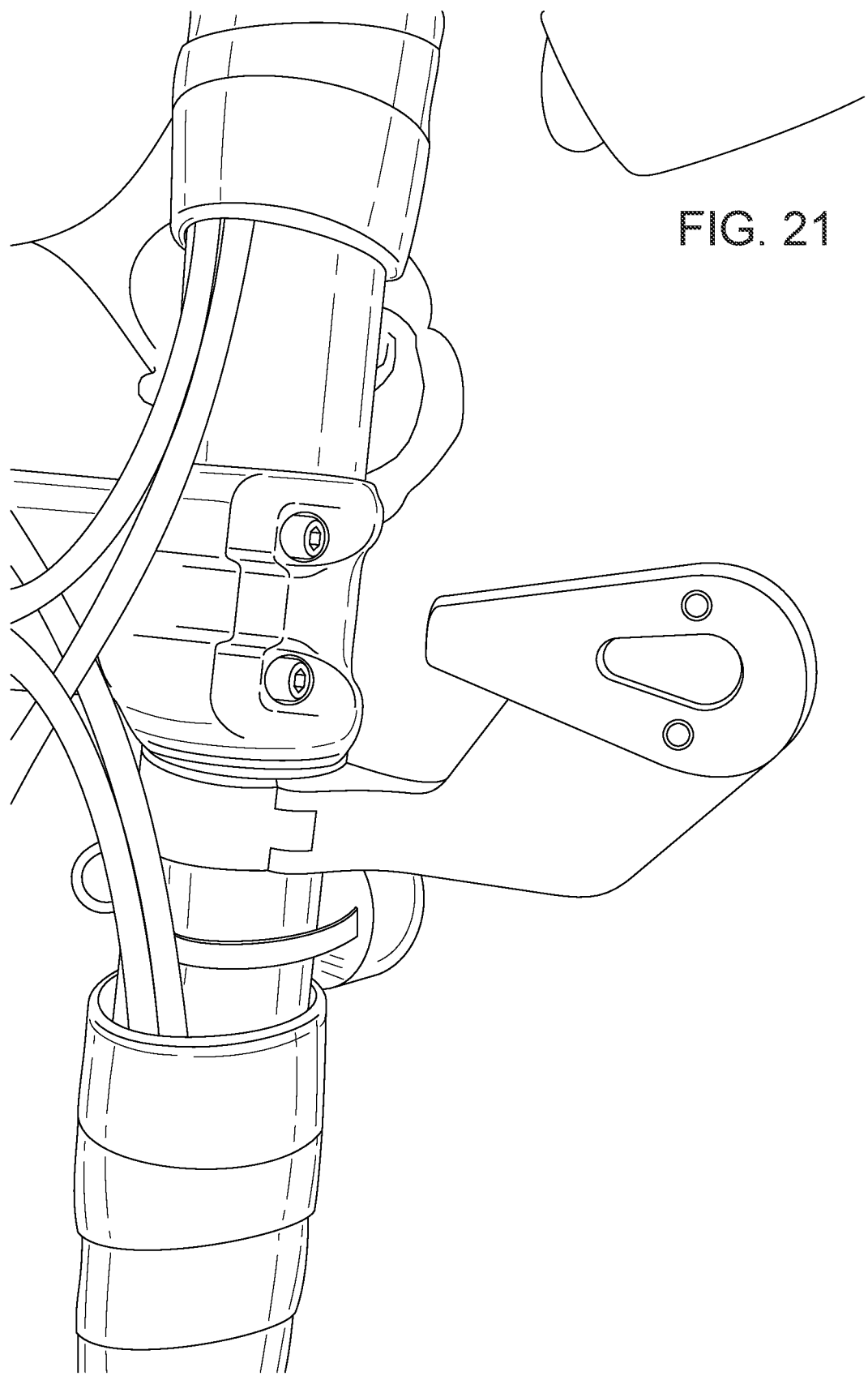
Figure 22:
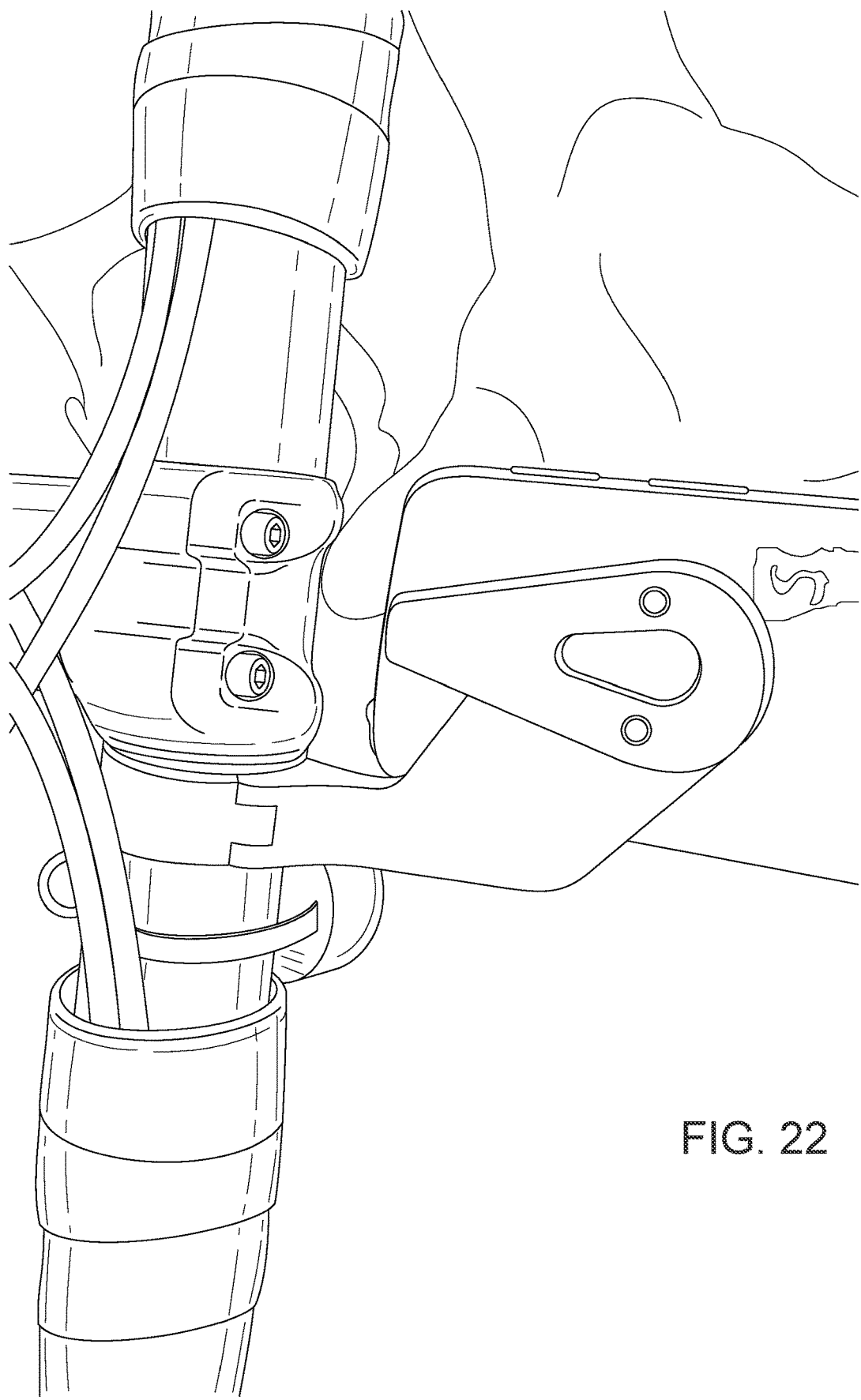
Figure 23:
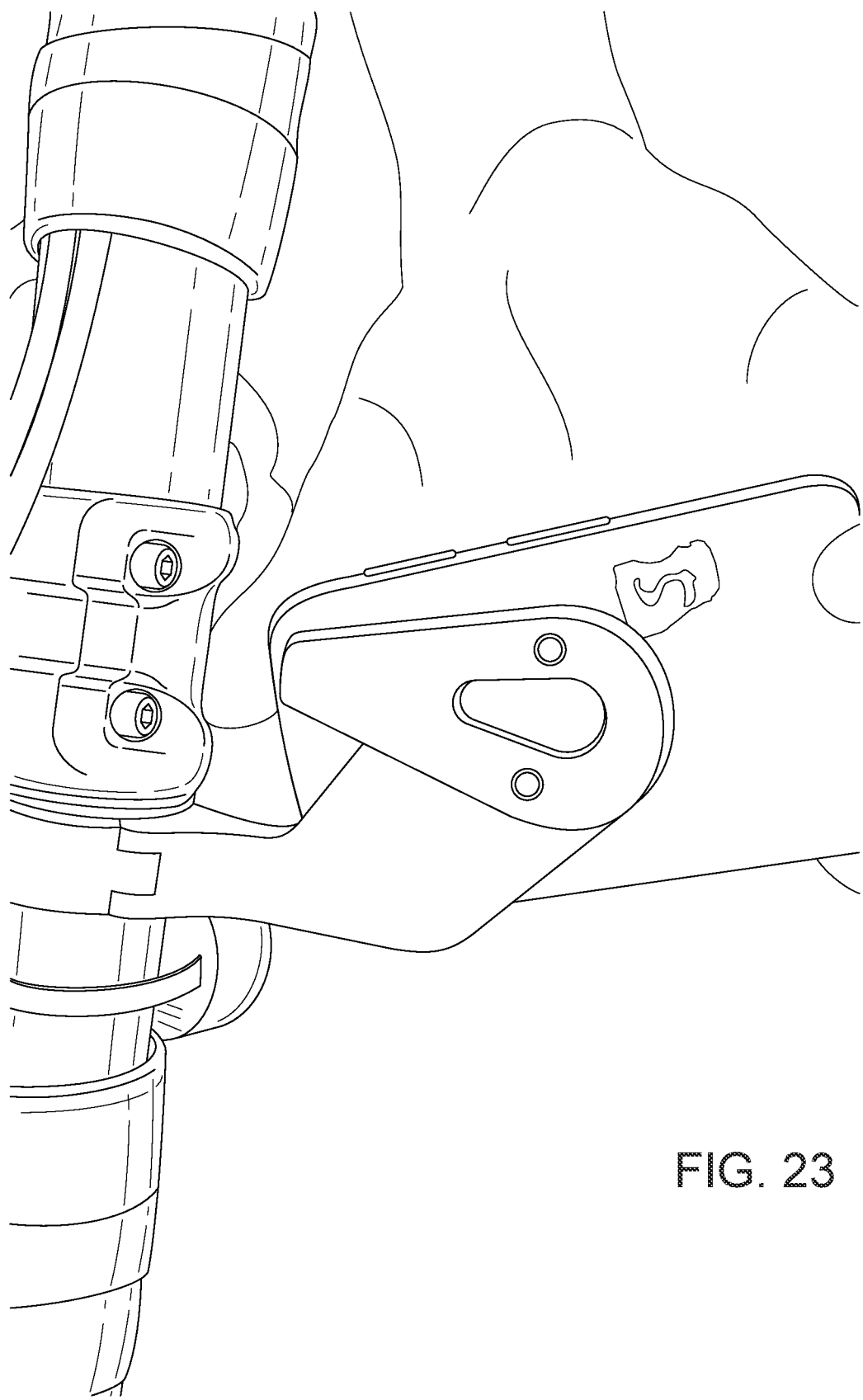
Figure 24:
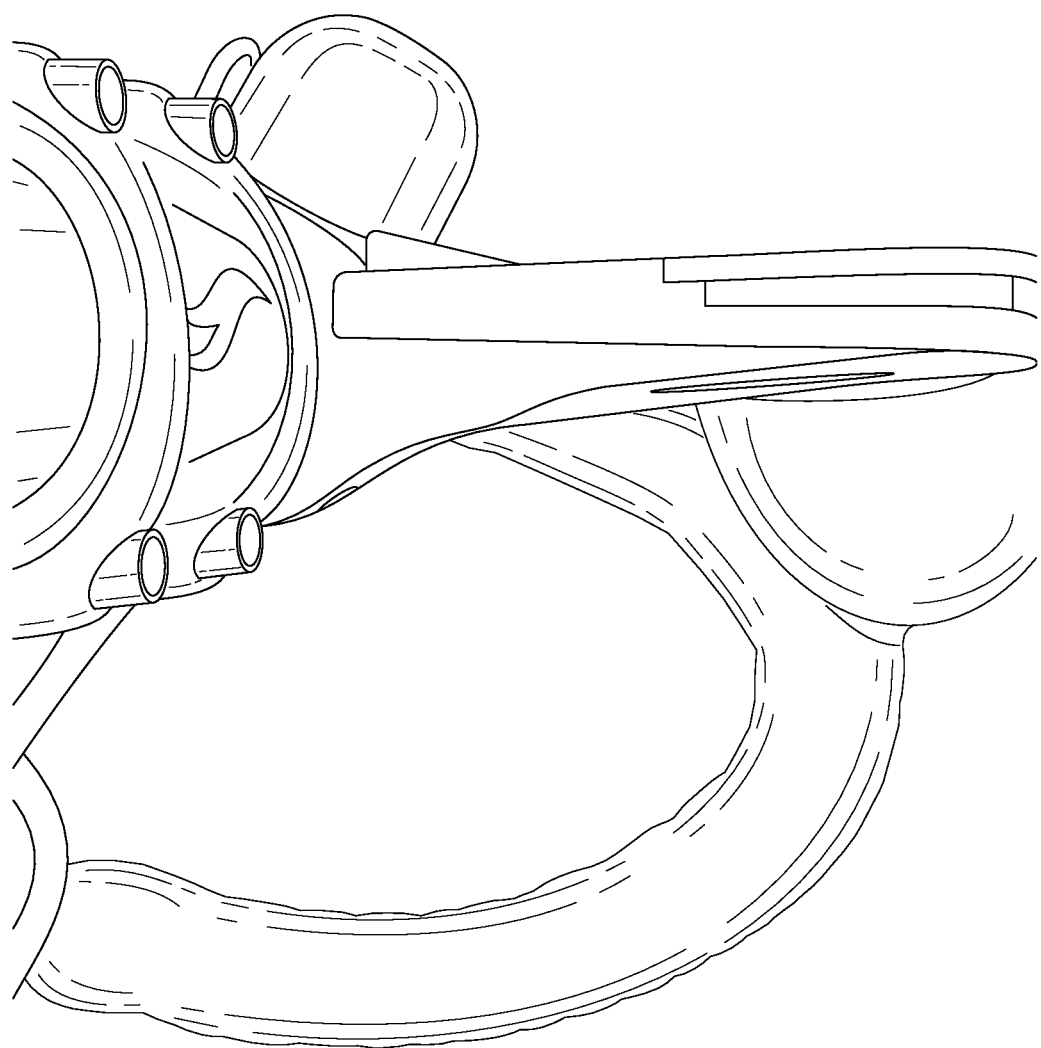
Figures 28A, 28B:
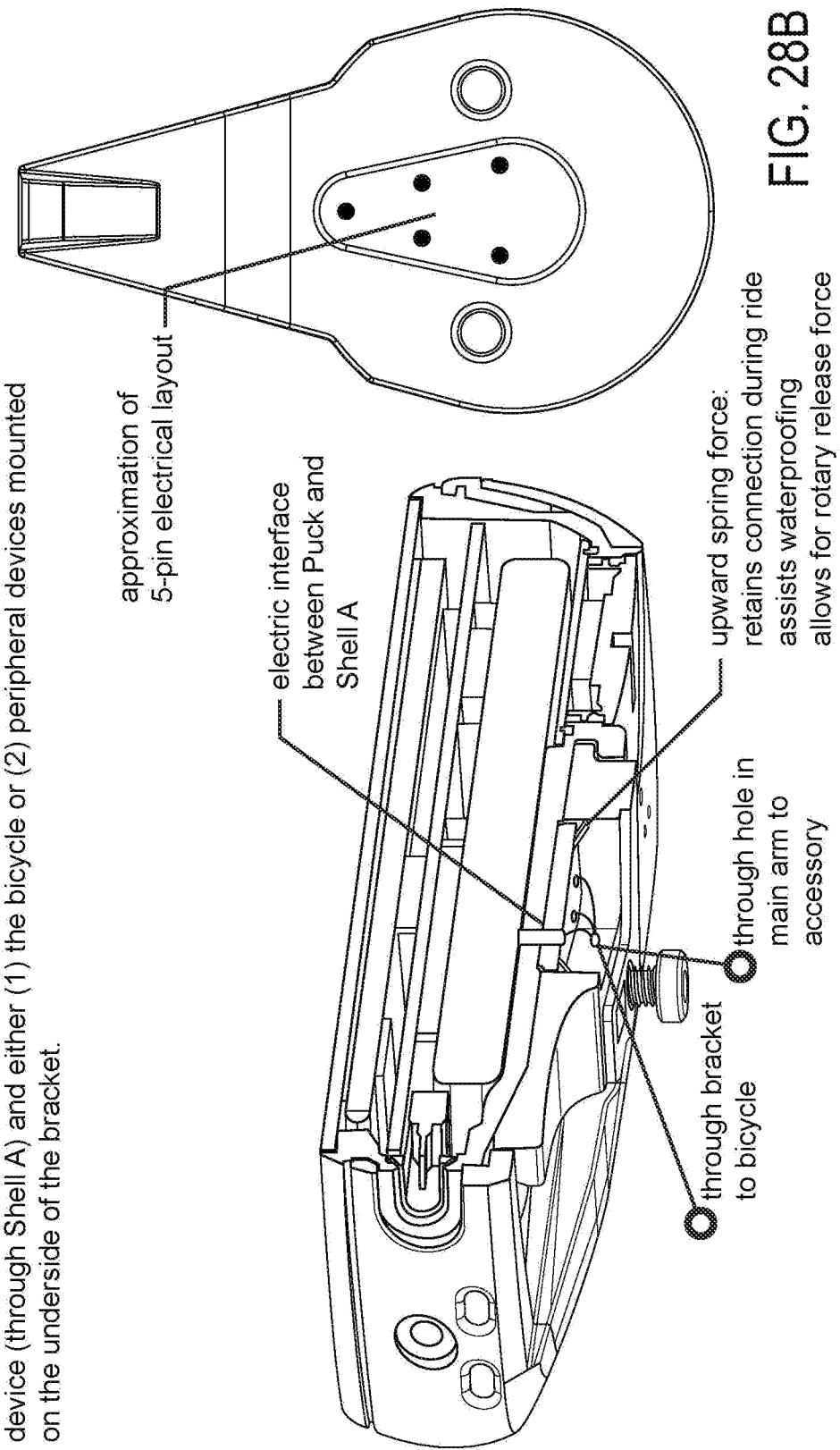

FIG. 11 shows an embodiment of a bracket holding a housing according to this disclosure.

FIGS. 12-15 show an embodiment of a housing being rotationally unmounted from a bracket (or vice versa) according to this disclosure. Therefore, the latch extends away from the exterior surface such that the latch is configured to disengage the detent in order rotationally unmount the housing from the plate. Likewise, the latch is configured to disengage the detent in order rotationally unmount the housing from the plate based on the latch not extending over the first protrusion, the second protrusion, and the detent. As such, the latch is configured to disengage the detent in order rotationally unmount the housing from the plate in a two-step rotary release.

FIG. 16 shows an embodiment of a bracket holding an electronic device having a housing according to this disclosure.

FIGS. 17-24 show an embodiment of a housing being linearly mounted onto a bracket (or vice versa) and rotationally unmounted from the bracket (or vice versa) according to this disclosure. In particular, the bracket is clamped onto a handlebar of a bicycle. Note that this disclosure is not limited to bicycles and can include any exercise device or any vehicle, whether land, aerial, or marine. Some examples of the exercise device include stationary bikes, weight lifting machines, treadmills, elliptical machines, rowing machines, ski machines, or others. Some examples of the vehicle include motorcycles, scooters, gliders, jet skis, or others. Likewise, this disclosure is not limited to handlebars and any bar, whether internally hollow or solid, whether cross-sectionally circular or cross-sectionally non-circular (e.g., square, pentagon, triangle, cross-section, V-shaped, polygonal, open-shaped, closed-shaped), whether longitudinally rectilinear or longitudinally non-rectilinear (e.g., circular, oval, sinusoidal, triangular, V-shaped, polygonal, open-shaped, closed-shaped), whether latticed, perforated, meshed, dimpled, knurled, or solid sidewall, can be used. As shown in FIGS. 17-24, the plate extends toward the handlebar and the latch avoids contact with the handlebar when the clamp clamps onto the handlebar.

FIGS. 25-28 show an embodiment of a housing and a bracket being in electrical communication with each other according to this disclosure. In particular, the plate can include an electrical contact or an electrical interface including the electrical contact or the latch includes the electrical contact. The arm can include an electrical contact or an electrical interface including the electrical contact.

In one mode of operation, a method can comprise: causing a clamp to clamp onto a handlebar of a vehicle; causing an arm extend from the clamp as the clamp clamps onto the handlebar; causing a plate to be supported by the arm as the clamp clamps onto the handlebar, wherein the plate includes an exterior surface and a latch, wherein the latch extends away from the exterior surface; and causing the latch to engage a detent of a housing in order to linearly mount the housing onto the plate.

In one mode of operation, a method can comprise: causing a clamp to clamp onto a handlebar of a vehicle; causing an arm extend from the clamp as the clamp clamps onto the handlebar; causing a plate to be supported by the arm as the clamp clamps onto the handlebar, wherein the plate includes an exterior surface and a latch, wherein the latch extends away from the exterior surface; and causing the latch to disengage a detent of housing linearly mounted on the plate in order to rotationally unmount the housing from the plate.

As explained above, in some embodiments, the bracket can provide a mechanical coupling interface between a bicycle handlebar and a removable cycling accessory (e.g., Karoo cycling computer). For example, the mechanical coupling interface can be configured for linear mounting of the removable cycling accessory and rotary un-mounting of the removable cycling accessory. This functionality can increase ease of mounting of the removable cycling accessory or can allow the removable cycling accessory to mount closer to a bicycle stem. For example, the mechanical coupling interface can provide a two-step rotary release that can include a set of fully locked, safe zone, and released positions thereby effectively reducing at least some risk of an accidental un-mounting of the removable cycling accessory. For example, the mechanical coupling interface can provide a spring force preloading in the plate that can effectively eliminates in-ride rattle. For example, the mechanical coupling interface can provide more surface area (e.g., 5 times) of contact rails than various conventional brackets. For example, the arm can have a "dual tube" construction that increases a strength-to-weight ratio and effectively eliminates, reduces, or minimizes at least some need for at least some external ribbing when injection molding in most common plastic. For example, the arm has a distinctive low-profile shape that helps to effectively reduce or minimize drag and effectively improve aerodynamics. For example, the bracket can include electrification functionality for charging or data transfer. For example, the mechanical coupling interface can interface with a fully integrated cycling technology system. This may include sensors, monitors, batteries, data processors, lights, and any number of other sub-systems or electrical loads of various types. For example, the electronic device with the housing may have a docking port that may or may not be housed within an "aero" style integrated handlebar and stem. For example, the bracket may include a universal serial bus (USB) instance, where at least some linear mounting allows for docking into a USB type C or other power/data port in both stationary indoor bicycles and traditional outdoor bicycles. Likewise, the bracket can include a loaded tab latching system that allows for linear un-mounting with an addition of a user actuated vertical release lever. For example, the bracket may include a connection interface, where a combination of at least some linear mounting and spring force preloading in the plate allows for the invention of a "floating" power/data interface that may be released with a rotary action. This floating interface may or may not be housed within an "aero" style integrated handlebar and stem. Note that at least some linear mounting and rotary un-mounting system may be applied to any number of cycling accessories including but not limited to lights, sensors, water-bottle holders, panier bags, or any other loads, whether physical, gravitational, electrical, or mechanical.

Various corresponding structures, materials, acts, and equivalents of all means or step plus function elements in various claims below are intended to include any structure, material, or act for performing the function in combination with other claimed elements as specifically claimed. Various embodiments were chosen and described in order to best disclose various principles of this disclosure and various practical applications thereof, and to enable others of ordinary skill in a pertinent art to understand this disclosure for various embodiments with various modifications as are suited to a particular use contemplated.

This detailed description has been presented for various purposes of illustration and description, but is not intended to be fully exhaustive or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. Scope of this disclosure is defined by various claims, which include known equivalents and unforeseeable equivalents at a time of filing of this disclosure.

What is claimed is:

1. A method comprising:
   causing a clamp to clamp onto a handlebar of a vehicle;
   causing an arm to extend from the clamp as the clamp clamps onto the handlebar;
   causing a plate to be supported by the arm as the clamp clamps onto the handlebar, wherein the plate includes an exterior surface, a plate retention lip at a first end of the plate furthest from the handlebar, and a latch wherein the latch extends away from the exterior surface, wherein the latch is at a second end of the plate opposite from the plate retention lip;
   causing the latch to engage a detent of a housing of an electronic device in order to linearly mount the housing of the electronic device onto the plate along the exterior surface of the plate; and
   causing the plate retention lip to engage a device retention lip of the housing of the electric device.

2. A method comprising:
   causing a clamp to clamp onto a handlebar of a vehicle;
   causing an arm to extend from the clamp as the clamp clamps onto the handlebar;
   causing a plate to be supported by the arm as the clamp clamps onto the handlebar, wherein the plate includes an exterior surface, a plate retention lip at an end of the plate furthest from the handlebar, and a latch extending from the exterior surface of the plate, wherein the latch is at a second end of the plate opposite from the plate retention lip; and
   causing the latch to disengage a detent of a housing of an electronic device linearly mounted on the plate in order to rotationally unmount the housing of the electronic device from the plate; wherein the plate retention lip does not disengage a device retention lip of the housing of the electric device once the latch is disengaged from the detent of the housing of the electronic device.

3. The method of claim 1, wherein the plate provides an elastic force onto the housing.

4. The method of claim 1, further comprising causing the plate to engage a retention lip of the housing.

5. The method of claim 1, wherein the detent is interposed between a first protrusion of the housing and a second protrusion of the housing.

6. The method of claim 5, further comprising causing the latch to engage a safe zone of the housing.

7. The method of claim 1, wherein the latch engages the detent without rotating the housing.

8. The method of claim 2, further comprising causing the plate to disengage a retention lip of the housing.

9. The method of claim 2, wherein the plate provides an elastic force onto the housing.

10. The method of claim 2, further comprising causing the latch to engage one of a first protrusion of the housing or a second protrusion of the housing once the latch disengages the detent, wherein the detent is interposed between the first protrusion and the second protrusion.

11. The method of claim 10, wherein the latch engages the first protrusion of the housing when the housing is rotated clockwise.

12. The method of claim 10, wherein the latch engages the second protrusion of the housing when the housing is rotated counterclockwise.

* * * * *